United States Patent [19]
Suzuki

[11] Patent Number: 5,796,736
[45] Date of Patent: Aug. 18, 1998

[54] ATM NETWORK TOPOLOGY AUTO DISCOVERY METHOD

[75] Inventor: Hiroshi Suzuki, Tokyo, Japan

[73] Assignee: NEC Corporation, Tokyo, Japan

[21] Appl. No.: 503,021

[22] Filed: Jul. 17, 1995

[30] Foreign Application Priority Data

Jul. 19, 1994 [JP] Japan ................................. 6-166856

[51] Int. Cl.$^6$ ....................................................... H04J 3/24
[52] U.S. Cl. ......................... 370/399; 370/395; 370/397; 370/471
[58] Field of Search ................... 370/352, 392, 370/395, 396, 397, 398, 399, 474, 389, 468, 471

[56] References Cited

U.S. PATENT DOCUMENTS

| | | | |
|---|---|---|---|
| 5,400,325 | 3/1995 | Chatwani et al. | 370/399 |
| 5,408,469 | 4/1995 | Opher et al. | 370/397 |
| 5,436,898 | 7/1995 | Bowen et al. | 370/389 |

OTHER PUBLICATIONS

K. Fujita, et al., "Network Management System for Multi-media ATM-LAN", NTT R&D Report, vol. 42, No. 3, 1993, pp. 424–433.

ATM User–Network Interface Specification, Version 3.0, Prentice Hall, Section 4: "Interim Local Management Interface Specification", pp. 106–147, 1993.

H. Ookane, "TCP/IP & OSI Network Management", Soft Research Center Co., Ltd., pp. 330–339, 1993.

HP Open View Network Node Manager Administrator's Reference, HP 9000 Series, Hewlett Packard, pp. 4–22—4–27, 1993.

Primary Examiner—Douglas W. Olms
Assistant Examiner—Shick Hom
Attorney, Agent, or Firm—Ostrolenk, Faber, Gerb & Soffen, LLP

[57] ABSTRACT

A network topology discovery method automatically recognizes the physical connection relationships of each ATM switch and each ATM terminal within an ATM network. Each ATM switch and ATM terminal mutually exchanges, by ILMI protocol, port identifiers that identify every ATM port of the ATM switch or ATM terminal as well as network addresses of network management agents that manage the ATM switch and the ATM terminal, to neighboring ATM switches and ATM terminals that are directly connected to its ports. Each ATM switch and ATM terminal stores tables for each of its ATM ports that include port identifiers which indicate the identities of connected ports as well as the network addresses of the network management agents that manage the neighboring ATM switches and ATM terminals. The ATM switches or ATM terminals automatically recognize the local connection relationships with its neighboring ATM switches or ATM terminals, using a network management system, by accessing connection information and then automatically recognizing the physical connection relationships of each ATM switch and each ATM terminal. The network management system recognizes the configuration within an ATM network, whether the network management system is inside or outside the ATM network, including when a router or existing LAN coexists with the ATM network. The identities of ports connected to each port are recognized, when a plurality of links exist between ATM switches, without requiring the assignment of a respective one of its ATM network management agents to each ATM switch. Interfaces between ATM switches as well as between an ATM switch and an ATM terminal are also automatically identified.

10 Claims, 19 Drawing Sheets

FIG.2
(PRIOR ART)

ROUTER 1 : DATALINK - IP ADDRESS TRANSLATION TABLE

| PORT | INF-TYPE | DATALINK ADDRS | IP ADDRESS |
|---|---|---|---|
| 2 | ETHERNET | MAC-HOST 2<br>MAC - NBS-B | IP-HOST 2<br>IP-NMS-B |
| 1 | ATM | ATM-HOST 1<br>ATM-HOST 3<br>ATM-HOST 4<br>ATM-NMS-A<br>ATM-sw 1<br>ATM-sw 2<br>ATM - sw 3/4 | IP-HOST 1<br>IP-HOST 3<br>IP-HOST 4<br>IP-NMS-A<br>IP-sw 1<br>IP- sw 2<br>IP - sw 3/4 |

FIG.12

ROUTER 1 - ATM PORT TABLE

| MY-PORT | UNI / NNI | NEIGHBOR AGENT | NEIGHBOR PORT |
|---|---|---|---|
| 1 | UNI | IP-sw 2 | 5 |

FIG.4

ILIMI MIB FOR PORT
5 OF Sw 2

| I AM SWITCH = 1,
MY PORT ID = 5,
MY AGENT ADDRESS
= IP -sw 2 |

(a-1)
↔
(a-2)

ILIMI MIB FOR PORT
1 OF ROUTER 1

| I AM SWITCH = 0,
MY PORT ID=1,
MY AGENT ADDRESS
=IP-ROUTER 1 |

ILMI MIB FOR PORT
3 OF Sw 2

| I AM SWITCH = 1,
MY PORT ID = 3
MY AGENT ADDRESS
= IP- sw 2 |

(b-1)
↔
(b-2)

ILMI MIB FOR PORT
6 OF sW 2

| I AM SWITCH = 1,
MY PORT ID =5,
MY AGENT ADDRESS
IP-sw 1 |

ILMI MIB FOR PORT
6 OF Sw 2

| I AM SWITCH = 1,
MY PORT ID=6,
MY AGENT
ADDRESS = IP-sw 2 |

(c-1)
↔
(c-2)

ILMI MIB FOR PORT
4-2 OF Sw 4

| I AM SWITCH = 1,
MY PORT ID= 4-2
MY AGENT ADDRESS
=IP-sw 3/4 |

ILMI MIB FOR PORT
6 OF Sw 2

| I AM SWITCH = 1,
MY PORT ID = 3-3,
MY AGENT ADDRESS
= IP- sw 3/4 |

(d-1)
↔
(d-2)

ILMI MIB FOR PORT
4-2 OF Sw 4

| I AM SWITCH = 1,
MY PORT ID = 4-3,
MY AGENT ADDRESS
= IP- sw 3/4 |

FIG.10
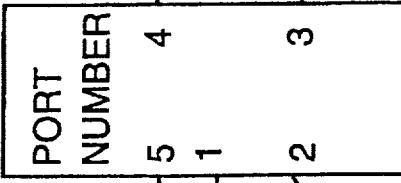

FIG. 11

(a) AGENT IP-sw1 - PORT TABLE

| MY-PORT | UNI/NNI | NEIGHBOR_AGENT | NEIGHBOR_AGENT |
|---|---|---|---|
| 1 | NNI | IP-sw2 | 2 |
| 2 | NNI | IP-sw 3/4 | 3-1 |
| 3 | UNI | NMS - A | 1 |
| 4 | UNI | IP-HOST 3 | 1 |
| 5 | NNI | IP-sw2 | 3 |
| 6 | LINK-DOWN | | |

(b) AGENT IP - sw 2 PORT TABLE

| MY-PORT | UNI/NNI | NEIGHBOR_AGENT | NEIGHBOR_AGENT |
|---|---|---|---|
| 1 | NNI | IP-sw 3/4 | 3-2 |
| 2 | NNI | IP-sw 1 | 1 |
| 3 | NNI | IP-sw1 | 5 |
| 4 | UNI | IP-HOST 1 | 1 |
| 5 | UNI | IP-ROUTER 1 | 1 |
| 6 | NNI | IP- sw 3/4 | 4-2 |

(c) AGENT IP- sw 3/4- PORT TABLE

| MY-PORT | UNI/NNI | NEIGHBOR_AGENT | NEIGHBOR_PORT | sw |
|---|---|---|---|---|
| 3-1 | NNI | IP-sw 1 | 2 | sw 3 |
| 3-2 | NNI | IP-sw 2 | 1 | |
| 3-3 | NNI | IP-sw 3/4 | 4-3 | |
| 4-1 | UNI | IP-HOST 4 | 1 | sw 4 |
| 4-2 | NNI | IP-sw 2 | 6 | |
| 4-3 | NNI | IP-sw 3/4 | 3-3 | |

5,796,736

1

ATM NETWORK TOPOLOGY AUTO DISCOVERY METHOD

BACKGROUND OF THE INVENTION

1. Field of the Invention

The present invention relates to a network topology discovery method in which ATM switches or ATM terminals automatically recognize local connection relationships with neighbor ATM switches or ATM terminals and relates to a network management system which by accessing the connection information, automatically recognizes the physical connection relationships between each ATM switch and each ATM terminal within an ATM network. The invention and particularly relates to an ATM network topology auto discovery method in which the network management system is equally capable of recognizing the ATM network configuration whether the network management system exists inside or outside the ATM network and, moreover, to an ATM network topology auto discovery method which is easily integrable with a method that automatically recognizes devices other than an ATM network and which lack an ATM interface, such as a router or host.

2. Description of the Related Art

In network topology auto discovery systems of IP (Internet Protocol) devices used in prior art network management systems, an auto IP node discovery system performs network topology auto discovery of the existing Internet.

According to the auto IP node discovery system, a network management system automatically discovers the connection relationships of terminals, routers, or bridges having an IP address and recognizes these connection relationships. As an example of an auto IP node discovery method, the Hewlett Packard IP node auto discovery method is described by Ookane (Ookane, Hisao. *SRC Handbook; SNMP and CMIP, TCP/IP and OSI Network Management*). This method can be summarized as follows:

According to this IP node auto discovery method, within the same subnet, the Network Management System (hereinafter abbreviated as "NMS") gets a MAC-IP address conversion Management Information Base (MIB) that is ARP-cached in each node by means of a Simplified Network Management Protocol (SNMP), and by confirming each node address by means of an "ICMP echo" command, discovers nodes (gateways or terminals having an IP). Through such discovery, the NMS recognizes IP nodes having a plurality of interfaces as gateways (routers). When the NMS recognizes a gateway node connected to the same net, it further discovers IP nodes connected to subnets linked to this router by accessing ARP cache tables relating to other subnetworks further linked to this gateway. By repeating operations from this point on, the NMS automatically recognizes the connection topology between nodes and gateways within each network.

An example of the prior art will next be explained with reference to FIG. 1.

In this case, the Network Management System (NMS) is based on a Simplified Network Management Protocol (SNMP). The ATM terminal is a router, a bridge, or a host having an ATM interface. In FIG. 1, router 1, host 1, host 3, host 4, and NMS-A are ATM terminals. The ATM switches are Sw1, Sw2, Sw3, and Sw4. Two NMS exist: NMS-A which is directly connected to the ATM network, and NMS-B which is outside the ATM network. NMS-B is connected to the Ethernet, as is non-ATM terminal host 2,

2 and manages each ATM switch within the ATM network by way of router 1.

In FIG. 1, ATM links are shown by heavy lines, and ATM switches or ATM terminal port IDs noted at both ends of these links. Port IDs allow each ATM switch or ATM terminal to independently identify each port.

MAC address and IP address conversion tables used in a LAN of the prior art are shown in FIG. 2. Port 2 is an Ethernet interface in which are cached the MAC addresses and IP addresses of host 2 and NMS-B. Port 1 is an ATM interface, and ATM addresses and IP addresses of SNMP agents of host 1, host 3, host 4, Sw1, Sw2, SW3/4 are cached here. ATM addresses and IP addresses are both obtained through the ARP protocol.

According to the IP node auto discovery method of the prior art, the type of IP node connected to each interface can be found by accessing the table of FIG. 2, but particularly in the case of an ATM network, because the physical connection relationships such as the identities of ports connected between ATM switches and/or ATM terminals are not shown, the IP node auto discovery method cannot be applied to ATM network configuration management. In addition, although the IP node auto discovery method can get the IP address of an ATM switch or ATM terminal within the ATM network by accessing this table, because this address information is obtained basically through ARP operation, the address information will not be discovered in cases where communication does not occur, i.e., when a node's existence is not recognized. Because this information is cached, it will be lost in the event of a "time out," causing recognition to be delayed even if network configuration changes. In addition, although the IP node auto discovery system can obtain this ARP information by sending broadcast packets, such a process is inefficient because it entails copying of numerous broadcast packets within the ATM network.

Furthermore, as will next be explained, the above-described IP node auto discovery method is unable to recognize the network connection configuration of ATM terminals such as ATM routers/ATM bridges/ATM hosts having ATM switches and ATM interfaces connected to an ATM network.

The existing IP node auto discovery method is intended for ATM terminals that are connected to each subnet which are also connected to a common media net such as a ring, or to an Ethernet or token ring bus, or for two devices that are mutually connected point-to-point by a telephone line or exclusive line. Accordingly, the connection relationship for each device in a subnet is limited to a simple bus/ring/point-to-point circuit. In contrast, network configuration management for an ATM network that considers a network in which one or more ATM switches are interconnected in a free connection topology as one IP subnet and in which an ATM terminal is connected to each ATM switch must not only manage configuration information that includes the connection relationship of each ATM switch within one subnet but must also manage the individual identities of ports to which ATM switches and ATM terminals are connected. Consequently, management of connection relationships and configuration information cannot be achieved by the existing Internet network topology auto discovery method according to the IP node auto discovery method, which is capable of recognizing only the positional relationships of ATM terminals connected simply by a common media or by point-to-point circuits within one subnet.

An auto network configuration recognition system in an ATM network is proposed in "Network management system for multimedia ATM-LAN" (NTT R&D Report, March 1993). In this system, each ATM switch within an ATM network exchanges information with neighbor ATM switches, each ATM switch automatically establishes ATM connections as far as NMS connected to the ATM network, and through the communication to the NMS of the connection relationships of each ATM switch by each ATM switch, the NMS automatically recognizes connection relationships of the ATM network.

However, this system operates on the condition that the NMS is connected to the ATM network and cannot be applied in the case of an NMS existing outside the ATM network. This system also does not function as a network auto configuration recognition method for the existing Internet as does the above-described IP node auto discovery system. Therefore, when realizing the Internet through an ATM, this system must include ATM network configuration management and Internet configuration management separately. In other words, a method that allows simultaneous auto recognition of network configuration for both the existing Internet and an ATM network does not presently exist. This system suffers from the further drawback that a separate NMS is required for each ATM network when a plurality of ATM networks are connected by a router, namely that the entire network configuration cannot be recognized by a single NMS. Furthermore, when a plurality of links exist between ATM switches, information cannot be obtained regarding which port of a neighbor ATM switch is connected to each port of each ATM switch.

In addition, this system initiates the establishment of connections from ATM switches to the NMS, in contrast to the IP discovery system which searches each Internet device from the NMS, so that the two systems are completely incompatible and difficult to integrate.

Finally, with in each ATM switch, routing protocol with an ATM switch, address registration protocol with an ATM terminal, and cell format at each port must be set depending on whether each port is a Network Node Interface (NNI) or User-Network Interface (UNI). Because prior art determination of these settings can only be achieved manually, a network manager must manually adjust settings each time network topology changes.

SUMMARY OF THE INVENTION

The present invention provides a network topology discovery method wherein an ATM switch or ATM terminal automatically recognizes the local connection relationship with neighbor ATM switches or ATM terminals, and by enabling automatic identification of an interface between ATM switches or between an ATM switch and an ATM terminal, allows the operation of the ATM network without requiring a network manager to set ATM switches.

In addition, the present invention provides a network topology management system in which an ATM switch or an ATM terminal automatically recognizes local connection relationships with neighbor ATM switches or ATM terminals, and in which a network management system automatically recognizes the physical connection relationships of each ATM switch and each ATM terminal within an ATM network by accessing the connection information.

In particular, the present invention provides an automatic network configuration management system in which a network management system is both capable of recognizing the configuration of an ATM network whether the network management system exists inside or outside the ATM network and, moreover, is easily integrable with a method that automatically recognizes devices other than an ATM network lacking an ATM interface, such as a router or host. Essentially, the present invention provides a network configuration management system capable of recognizing configuration using the same method even when a router or existing LAN coexist with an ATM network.

The present invention also provides a network configuration management system capable of recognizing the individual identities of connected ports when a plurality of links exist between ATM switches.

Finally, the present invention provides these functions without requiring the assignment of one ATM network management agent to each ATM switch.

The present invention comprises the following methods:

(1) An ATM network topology discovery method wherein, in an ATM network in which a plurality of ATM switches and ATM terminals are freely connected, each ATM switch or each ATM terminal holds a switch identifier that indicates whether it is an ATM switch, and mutually communicates this switch identifier with neighbor ATM switches or ATM terminals;

by means of this communication, each ATM switch and each ATM terminal recognizes, for each port, whether an ATM switch or an ATM terminal is connected beyond the port;

as a result of recognition, the port determines whether a Network Node Interface connects two ATM switches or a User-Network Interface connects an ATM switch and an ATM terminal; and as a result of determination, a protocol complying with each interface is automatically set.

(2) An ATM network topology discovery method wherein, in an ATM network in which a plurality of ATM switches and ATM terminals are mutually connected, each ATM switch or each ATM terminal holds a network address of a network management agent that manages that ATM switch or that ATM terminal and mutually communicates this network address of the network management agent with neighbor ATM switches or ATM terminals that are directly connected to each ATM port of that ATM switch or that ATM terminal;

each ATM switch or each ATM terminal holds a first table for storing correspondences for each ATM port of network addresses of network management agents that manage neighbor ATM switches as well as neighbor ATM terminals that are directly connected to the port;

using the network address of the network management agent of an arbitrary ATM switch or an arbitrary ATM terminal, a network management system accesses that ATM switch or that ATM terminal, and by reading out the first table, discovers the network addresses of network management agents that manage neighbor ATM switches as well as neighbor ATM terminals that are directly connected to the accessed ATM switch or ATM terminal, and by accessing network management agents having the discovered network addresses, discovers neighbor ATM switches or neighbor ATM terminals managed by the network management agent; and by repeating the above-described operations, the network management system recognizes ATM switches or ATM terminals connected to each port of each ATM switch or each ATM terminal within the ATM network, and automatically discovers connection relationships of each ATM switch and ATM terminal.

(3) An ATM network topology discovery method wherein, in an ATM network in which a plurality of ATM switches and ATM terminals are mutually connected, each ATM switch or each ATM terminal holds a port identifier that identifies each port for every ATM port of that ATM switch or that ATM terminal, and mutually communicates this port identifier with neighbor ATM switches or ATM terminals that are directly connected to that port;

each ATM switch or each ATM terminal holds for every ATM port a second table that stores the port identifiers of neighbor ATM switches as well as neighbor ATM terminals that are directly connected to that port;

the network management system, by accessing the second table of each ATM switch as well as ATM terminal, automatically recognizes which ATM ports of neighbor ATM switches or neighbor ATM terminals each ATM port of each ATM switch or each ATM terminal is connected to.

(4) An ATM network topology discovery method according to above description (2) and (3) wherein, when one network management agent manages a plurality of ATM switches or ATM terminals, the network management agent distinguishes the plurality of ATM switches or the plurality of ATM terminals, each network management agent has a plurality of tables for each of the plurality of ATM switches or the plurality of ATM terminals, these tables indicating network addresses of network management agents of neighbor ATM switches and ATM terminals that are connected to each port of each ATM switch or each ATM terminal, and also indicating to which ports of neighbor ATM switches and ATM terminals each port is connected.

(5) An ATM network topology discovery method according to above description wherein, as the means by which each ATM switch and ATM terminal mutually communicates network addresses of network management agents, ATM port identifiers, or switch identifiers with neighbor ATM switches and ATM terminals, each ATM switch and each ATM terminal holds in each port each address and each identifier as a Management Information Base (MIB), and neighbor switches or neighbor terminals communicate with each other by means of an MIB exchange procedure.

The above and other objects, features, and advantages of the present invention will become apparent from the following description based on the accompanying drawings which illustrate examples of preferred embodiments of the present invention.

BRIEF DESCRIPTION OF THE DRAWINGS

FIG. 2 shows an address conversion table that is managed by an SNMP agent of router 1;

FIG. 4 is a view illustrating the ILMI MIB of each port;

FIG. 10 shows the generation of neighbor MIB tables in Sw1;

FIG. 11 shows a port connection relationship table managed by the SNMP agent of each switch;

FIG. 12 shows a port connection relationship table managed by the SNMP agent of router 1;

DETAILED DESCRIPTION OF THE PREFERRED EMBODIMENTS

Figure 1:
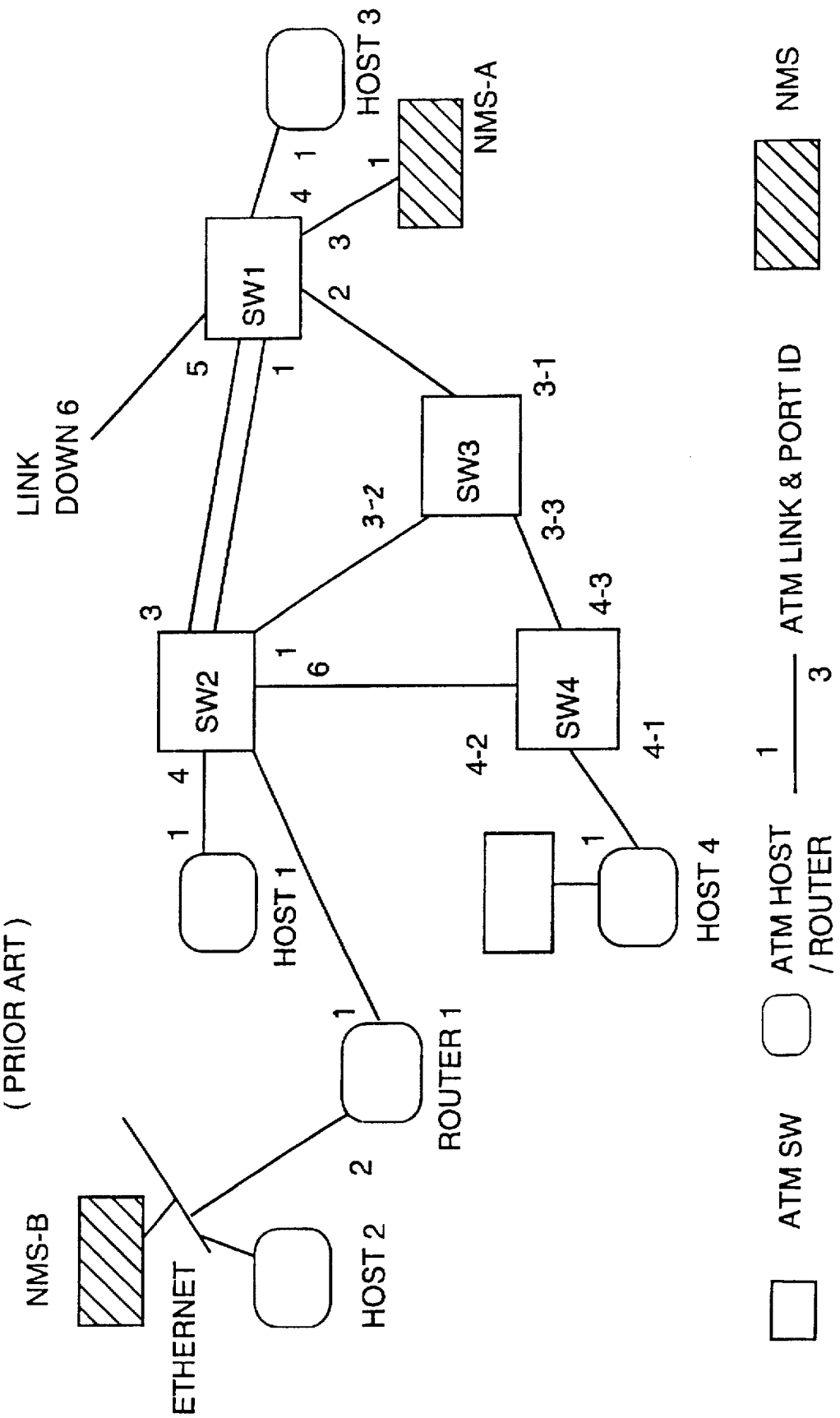
FIG. 1 shows an example of the overall configuration of an existing LAN and an ATM network according to the prior art.

An embodiment of the present invention is explained with reference to FIG. 3.

The network management system (NMS) of the present embodiment is based on a Simplified Network Management Protocol (SNMP). The NMS agent of each NMS and ATM switch as well as the ATM terminal communicates using SNMP/UDP/IP protocol. In the ATM network, communication is effected after setting the PVC/SVC. However, the basic principles of the present invention still apply if other network management protocols are used, for example, CMIP protocol in place of SNMP, and IPX or Appletalk in place of IP protocol.

Here, an ATM terminal is a host having an ATM interface, or a router or bridge. In FIG. 3, router 1, host 1, host 3, host 4, and NMS-A are ATM terminals, and Sw1, Sw2, Sw3, and Sw4 are ATM switches. The network management systems may be directly connected to the ATM network, such as NMS-A, or may be outside the ATM network, such as NMS-B, and the explanation of the present embodiment will deal with both cases. As the non-ATM terminal, NMS-B is connected to the Ethernet, as is host 2, and manages each ATM switch within the ATM network by way of router 1.

Figure 3:
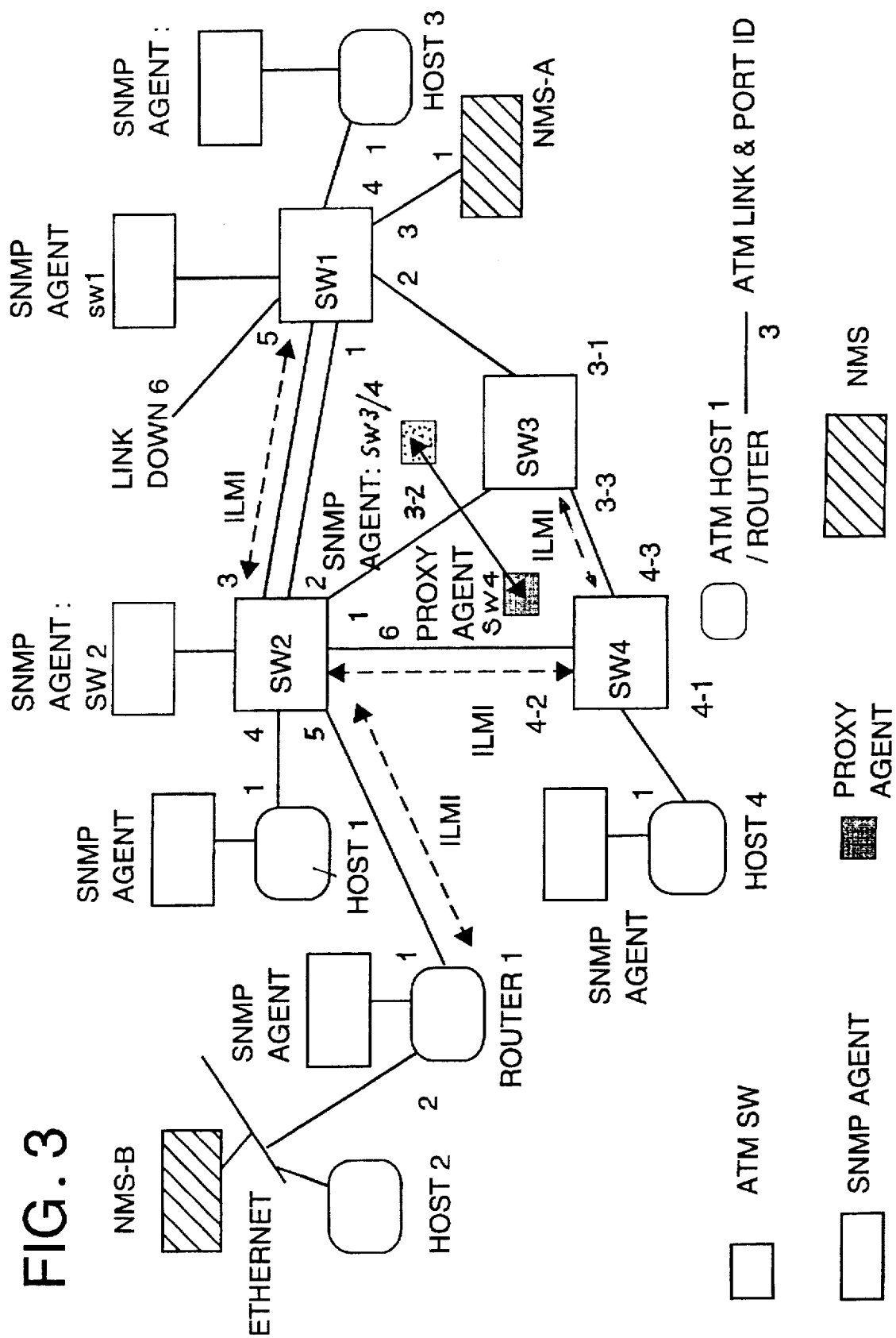
FIG. 3 shows an example of an overall configuration of an existing LAN and an ATM according to the present invention.

The heavy lines in FIG. 3 indicate ATM links, and at both ends of which are affixed port identifiers (Port IDs) of ATM switches or ATM terminals. Port IDs enable each ATM switch or ATM terminal to independently distinguish each port. Here, an MIB that indicates the physical state/logical state of each port in an ATM link is managed, and this MIB enables mutual reading and communicating of port states by ILMI (Interim Local Management Interface) protocol as specified in "The ATM Forum User Network Specification, Ver. 3.0." This MIB is referred to as ILMI MIB. ILMI protocol is installed at all Network Node Interfaces (NNI) between ATM switches and at User-Network Interfaces (UNI) between ATM switches and ATM terminals. Neighbor ATM terminals or ATM switches communicate by a default VC (Virtual Connection). In the embodiment shown in FIG. 3, explanation will be given regarding only information exchanged through ILMI protocol concerning the ATM links Sw2-router 1, Sw2-Sw1, Sw2-Sw4, and Sw3-Sw4, but it is assumed that in the other links, information regarding port state is exchanged with neighbor switches or neighbor terminals in the same way through ILMI protocol.

However, the principles of the present invention are generally unaffected when applied in methods in which ILMI is not used if, for every port of each ATM switch or ATM terminal, a variable is held indicating the above-described physical state/logical state, and a controller of each ATM switch or ATM terminal exchanges the variable with a neighbor ATM switch or ATM terminal.

An SNMP agent is installed in each of ATM terminals host 1, host 3, host 4, and ATM switches Sw1, Sw2 having network addresses IP-host 1, IP-host 3, IP-host 4, IP-Sw1, and IP-Sw2, respectively.

When the system rises, each SMNP agent assigns a port identifier (Port ID) to each port. For example, Port IDs=1, 2, 3, 4, 5, 6 are assigned to Sw1 and Port IDs=1, 2, 3, 4, 5, 6 are assigned to Sw2.

With regard to the first embodiment of the present invention, FIG. 4 shows an example of information that is exchanged by ILMI protocol between ATM switches or between an ATM terminal and an ATM switch neighboring an ATM terminal. This information is held in ILMI MIB form, but in the first embodiment of the present invention, only the "I am Switch" of the MIB pertains to the present invention. The "I am Switch" indicates whether a switch or terminal is an ATM switch or not, having a value "1" when it is an ATM switch and a value "0" when it is an ATM terminal.

FIG. 4 shows the following information:

(a-1) is the content of ILMI MIB of Port 5 of Sw2, (a-2) is the content of ILMI MIB of Port 1 of router 1, (b-1) is the content of ILMI MIB of Port 3 of Sw2, (b-2) is the content of ILMI MIB of Port 5 of Sw1, (c-1) is the content of ILMI MIB of Port 6 of Sw2, (c-2) is the content of ILMI MIB of Port 4-2 of Sw4, (d-1) is the content of ILMI MIB of Port 3-3 of Sw3, and (d-2) is the content of ILMI MIB of Port 4-3 of Sw4.

The above information is exchanged on each ATM link with neighbor switches or neighbor terminals through ILMI protocol. For example, (a-1) and (a-2) are exchanged over the link between Sw2 and neighbor router 1, (b-1) and (b-2) are exchanged over the link between Sw2 and neighbor Sw1, (c-1) and (c-2) are exchanged over the link between Sw2 and neighbor Sw4, and (d-1) and (d-2) are exchanged over the link between Sw3 and neighbor Sw4.

Figure 5:
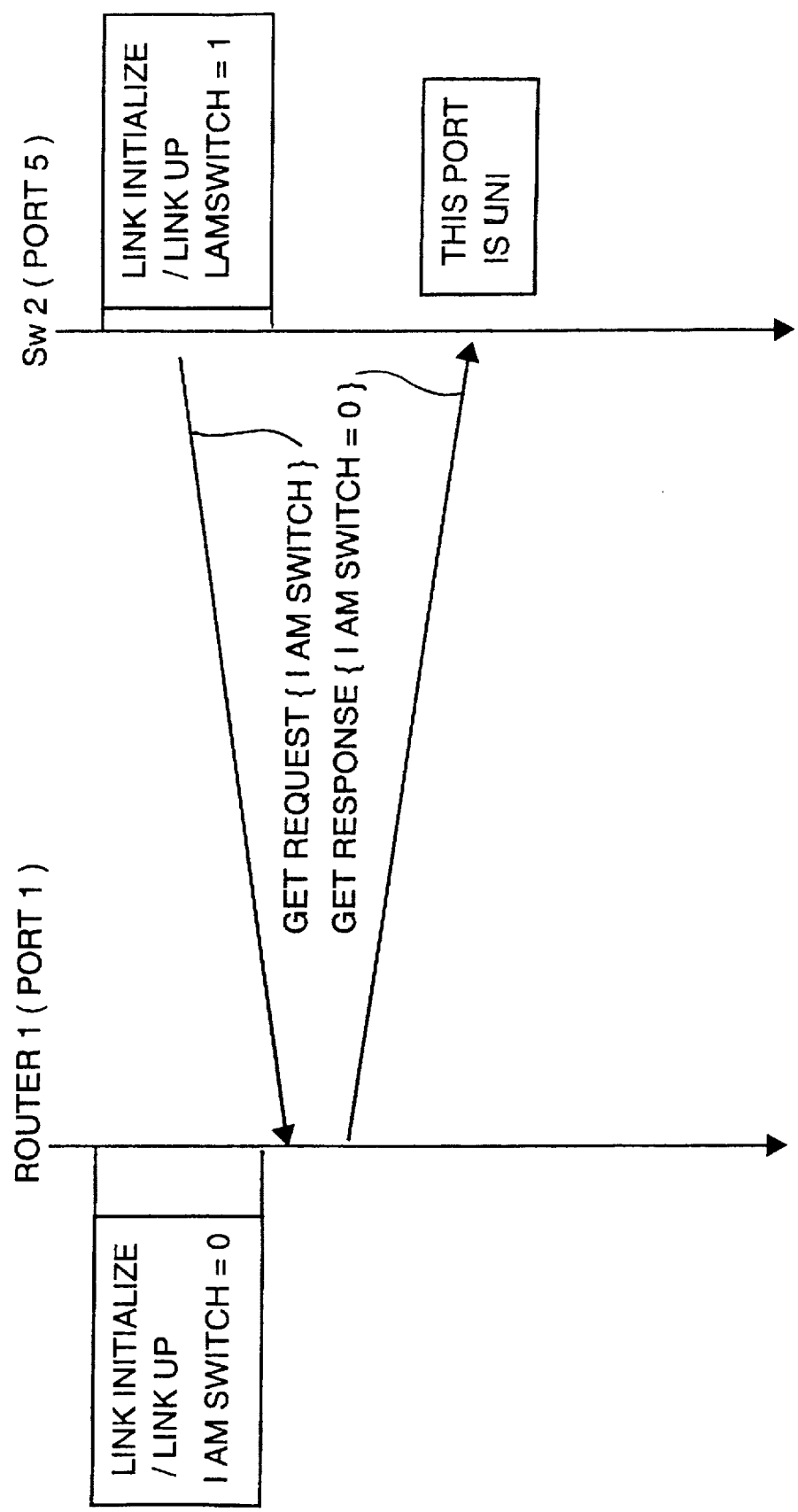
FIG. 5 shows the sequential flow of communication by a GET command and NNI/UNI recognition between Sw2 and router 1.
Figure 6:
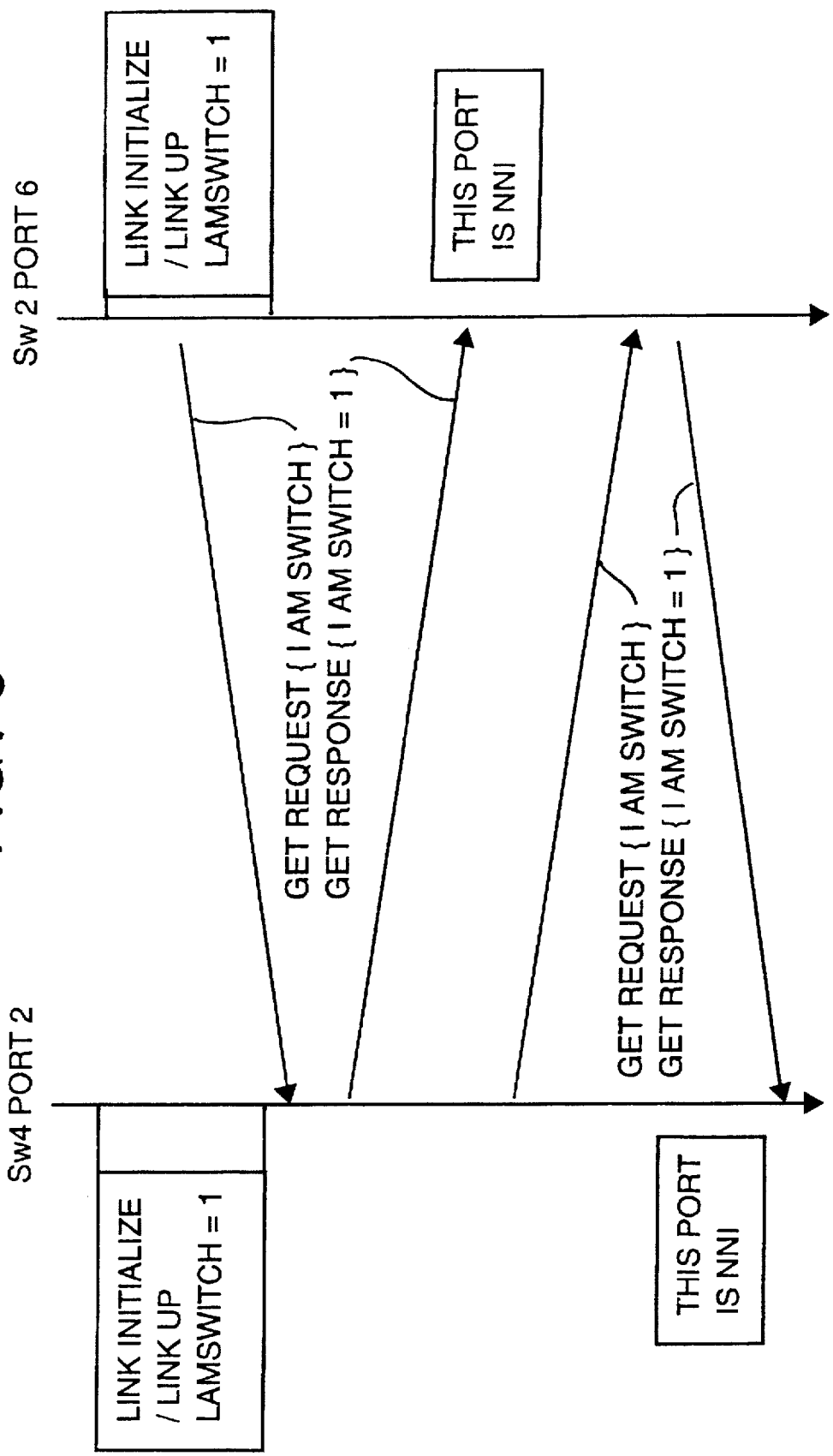
FIG. 6 shows the sequential flow of communication by a GET command and NNI/UNI recognition between Sw2 and Sw4.

These communications are executed by traps when it is detected on a physical level that these links are in a state of normal connection, that is, when in the "link initialize" state or "link up" state, or are executed by periodically sending GET commands. As described hereinabove, in the case of change in the state of links or in the case of periodic information exchange by ILMI protocol, the state of each port is communicated to neighbor switches or neighbor terminals even if the network configuration should change. FIG. 5 shows mutual information exchange between Sw2 and Router 1, and FIG. 6 shows mutual information exchange between Sw2 and Sw4.

Figure 7:
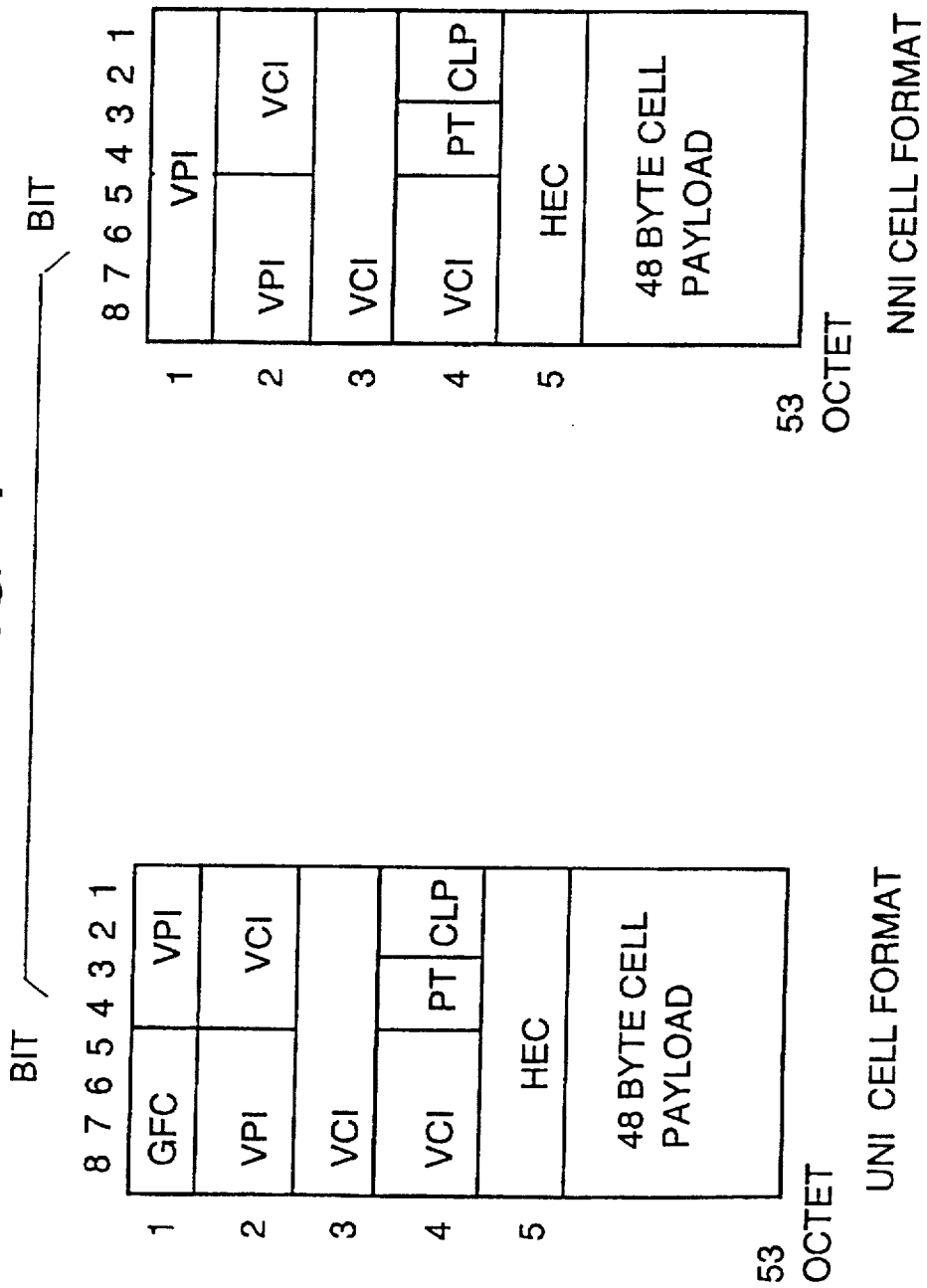
FIG. 7 shows UNI/NNI cell format.

It should be noted here that only for router 1 is "I am switch=0." Sw2 is able to distinguish that port 5 is a UNI port owing to communication of this 0 data by router 1 to Sw2. Conversely, if the state of the object port is "I am Switch=1," because Sw2 is an ATM switch ("I am Switch= 1" for its own port), port 6 of Sw2 is identified as an NNI port. As explained hereinabove and shown in FIG. 7, cell format is automatically set for cases in which Sw2 is UNI or NNI. In other words, the GFC field at the head of an ATM cell is set in the case of UNI but not set for NNI. The VPI bit number of the head is also set. Furthermore, for UNI, an ILMI address registration protocol procedure is initiated, while an NNI routing protocol procedure is initiated for NNI. UNI and NNI settings have been set manually in the prior art, but according to the above-described procedures, each ATM switch automatically identifies UNI and NNI, and UNI and NNI are automatically set individually.

Next, will be explained the second embodiment of the present invention.

As shown in FIG. 4, in the second embodiment, "My Agent Address" is added to ILMI MIB exchanged according to ILMI protocol between each ATM switch and ATM terminal and neighbor switches or neighbor terminals. "My Agent Address" indicates the network address of the SNMP agent that manages the ATM switch or ATM terminal. Although an IP address is used in every case, in FIG. 4, the identification IP-Sw2 is used to allow identification of protocol and thus allow the use of addresses of a different protocol.

The information for "My Agent Address" shown in FIG. 4 is exchanged with neighbor switches or neighbor terminals by ILMI protocol for every ATM link. For example, by mutually communicating information over the ATM links as follows:

(a-1) (a-2) between Sw2 and neighbor router 1, (b-1) (b-2) between Sw2 and neighbor Sw1, (c-1) (c-2) between Sw2 and neighbor Sw4, (d-1) (d-2) between Sw3 and neighbor Sw4, the "My Agent Address" of a neighbor ATM switch or ATM terminal is read, whereby each ATM switch can recognize the agent to which a neighbor ATM switch or ATM terminal is connected.

Figure 8:
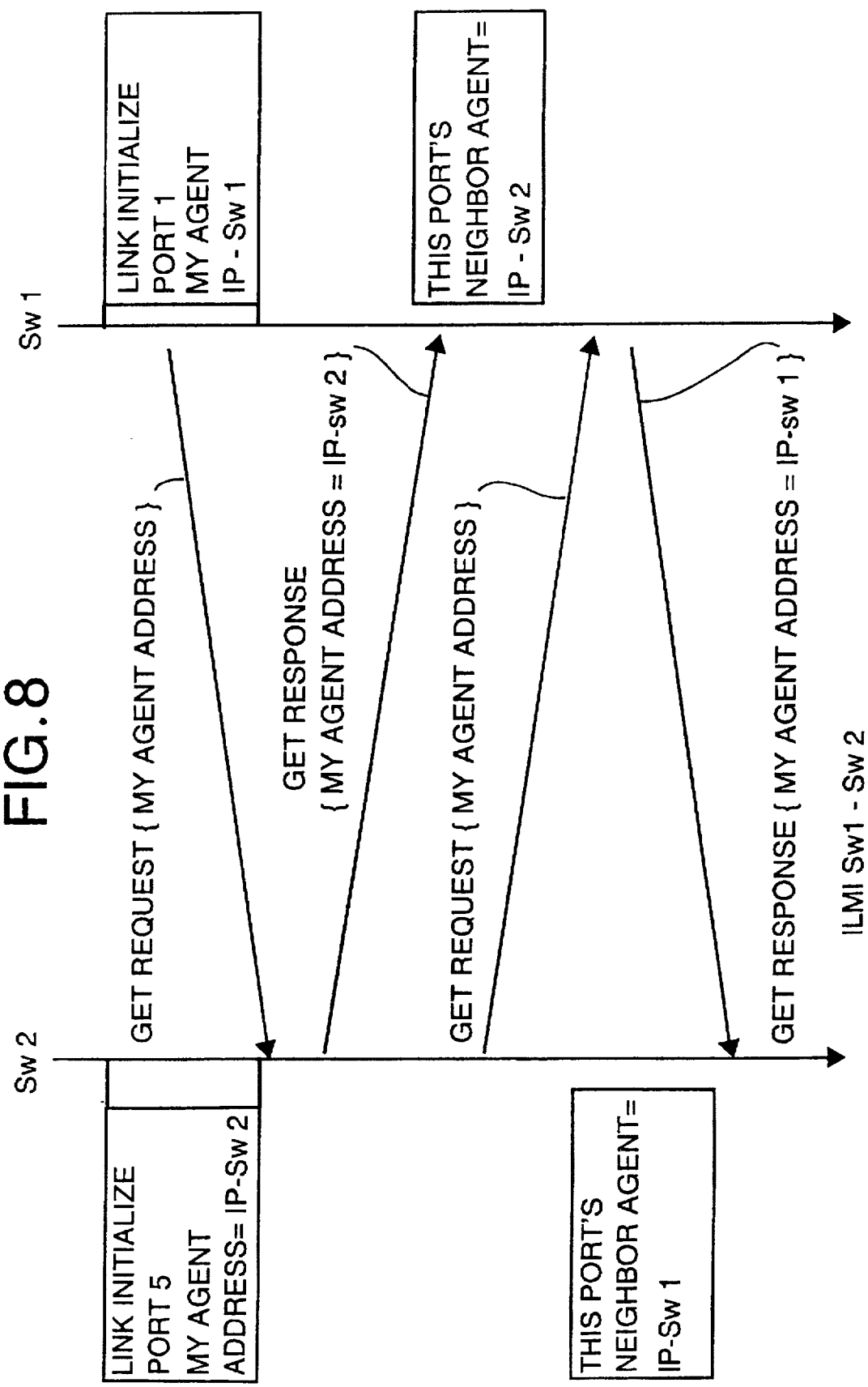
FIG. 8 shows the sequential flow of communication by a GET command and neighbor discovery for Sw1 and Sw2.
Figure 9:
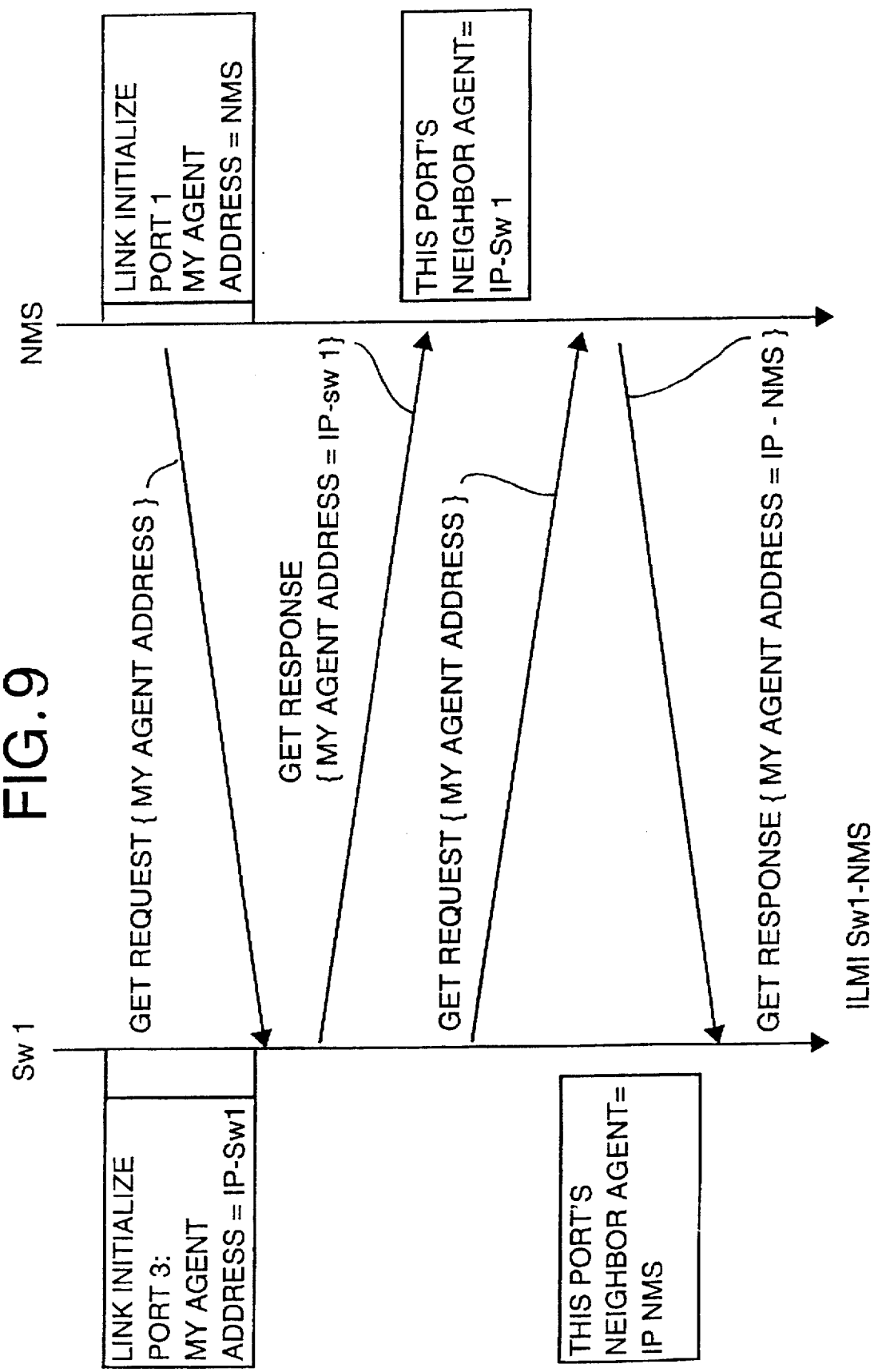
FIG. 9 shows the sequential flow of communication by a GET command and neighbor discovery for Sw1 and NMS.

The communication of this information is effected by traps when each ATM link is detected on a physical level to be in a state of normal connection, i.e., in a "link initialize" state or "link up" state, or is effected by periodic sending of GET commands. As described above, during a change in the state of links or during periodic information exchange by ILMI protocol, each ATM switch is capable of recognizing which network addresses are held by agents managing neighbor switches or neighbor terminals even if the network configuration should change. For example, FIG. 8 shows information exchange between Sw1 and Sw2, FIG. 9 shows information exchange between Sw1 and the NMS, and FIG. 10 shows the resulting production of an MIB table by Sw1. In the same way, each ATM switch produces an MIB table as shown in FIG. 11.

Through the ILMI MIB conversion according to the second embodiment of the present invention, each switch SNMP agent of each ATM switch can have a port connection relationship table as shown in FIG. 11, (a) being the port table of agent IP-Sw1, (b) being the port table of agent IP-Sw2, and (c) being the port table of agent IP-Sw3.

The port connection relationship table of FIG. 11 has the following entries. "My-port" is the port ID of that port. "UNI/NNI" either indicates whether each port is NNI or UNI or indicates "link down" if the port cannot be determined. For example, port 6 of Sw1 is not linked to any point and is therefore classified "link down." As described hereinabove, NNI/UNI is determined through exchange of "I am Switch" MIB of ILMI MIB, and the table shown in FIG. 11 is produced as a result. "Neighbor agent" is the network address of the SNMP agent that manages the neighbor ATM switch or ATM terminal and has the values of "My Agent Address" of the neighbor ATM switches or ATM terminals that are acquired through ILMI MIB exchange and copied.

For example, from (a) in FIG. 11, it can be seen that Sw1 is connected: at port 1 to the ATM switch managed by agent IP-Sw2; at port 2 to the ATM switch managed by agent IP-Sw3/4; at port 3 to port 1 of NMS-A; at port 4 to the ATM terminal managed by agent IP-host 3; and at port 5 to the ATM switch managed by agent IP-Sw2. Here, each port is a bidirectional port.

It should be noted here that it is the IP address of the SNMP agent managing the ATM switch or ATM terminal connected to each port that is managed in the table, and not the address of the ATM switch or ATM terminal connected to the port and not a special ATM node identifier. The reason that the IP address of the SNMP agent is managed in the table is as follows: According to the second embodiment of the present invention, a network management system is equally capable of discriminating the physical connection relationships within the ATM network even in cases when, as shown in FIG. 3, NMS-A is connected directly to the ATM network, or NMS-B is connected outside the ATM network. In the case of NMS-B, which is connected outside the ATM network, NMS-B must access ATM switches Sw1, Sw2, Sw3, and Sw4 by way of router 1. When each switch is accessed, only the SNMP agent IP address of each agent is meaningful to router 1. Essentially, when each ATM switch is identified by an ATM node identifier or ATM address in the ATM network, NMS-A within the ATM network may effectively directly use the ATM network and access each ATM switch. But in the case of NMS-B, which is connected by way of router 1, router 1 can only identify network addresses and cannot distinguish which ATM switch or ATM terminal NMS-B wishes to access. Accordingly, NMS-B employs network addresses of SNMP agents managing each ATM switch or ATM terminal, and this point constitutes one feature of the present invention.

FIG. 12 shows an ATM port connection relationship table held by router 1, which is one ATM terminal, and FIG. 2 shows an address conversion cache table of standard data link addresses and network addresses. From FIG. 12 it can be seen that port 1 is UNI, the neighbor ATM switch is IP-Sw2, and this switch is managed by an SNMP agent and is connected at port 5 of the ATM switch.

A conversion table for MAC addresses and IP addresses used in an LAN of the prior art is shown in FIG. 2. Port 2 is an Ethernet interface, and the MAC addresses and IP address of host 2 and NMS-B are cached at port 2. On the other hand, port 1 is an ATM interface, and the ATM addresses and IP addresses of SNMP agents of host 1, host 3, host 4, Sw1, Sw2 and Sw3/4 are cached at port 1. The ATM addresses and IP address are both obtained through ARP protocol.

When the table of FIG. 2 is accessed by the prior art IP node auto discovery system, the type of-IP node connected to each interface can be found, but because this table does not indicate the physical connection relationships, i.e., the individual identities of ports and ATM switches or ATM terminals connected to each port, this prior art IP node auto discovery system cannot be applied to configuration management of an ATM network. Furthermore, although the IP node auto discovery system can obtain IP addresses of ATM switches or ATM terminals within the ATM network by accessing this table, this address information is basically obtained through ARP operations, and the address information cannot be acquired when communication does not occur. Namely, when the existence of the nodes is not recognized because the information is cached, it is lost in the event of a "time out," resulting in delayed recognition if the network configuration changes. In addition, although the IP node auto discovery system can obtain this ARP information by sending broadcast packets, such a process is inefficient because it entails copying of numerous broadcast packets within the ATM network.

In contrast, the connection relationship table shown in FIG. 11 holds only the states obtained through mutual communication of the state of each port between each ATM switch or ATM terminal with neighbor ATM switches or ATM terminals by ILMI protocol. Accordingly, the necessary control information is only the messages exchanged on each link, and it can be seen that connection information for each port can be managed without exception.

Based on the tables shown in FIGS. 2, 11, and 12, explanation will be given regarding the manner in which network management system NMS-A or NMS-B performs configuration management of an entire network that includes an ATM network configuration and an existing LAN. NMS-A will first be explained.

Figure 13:
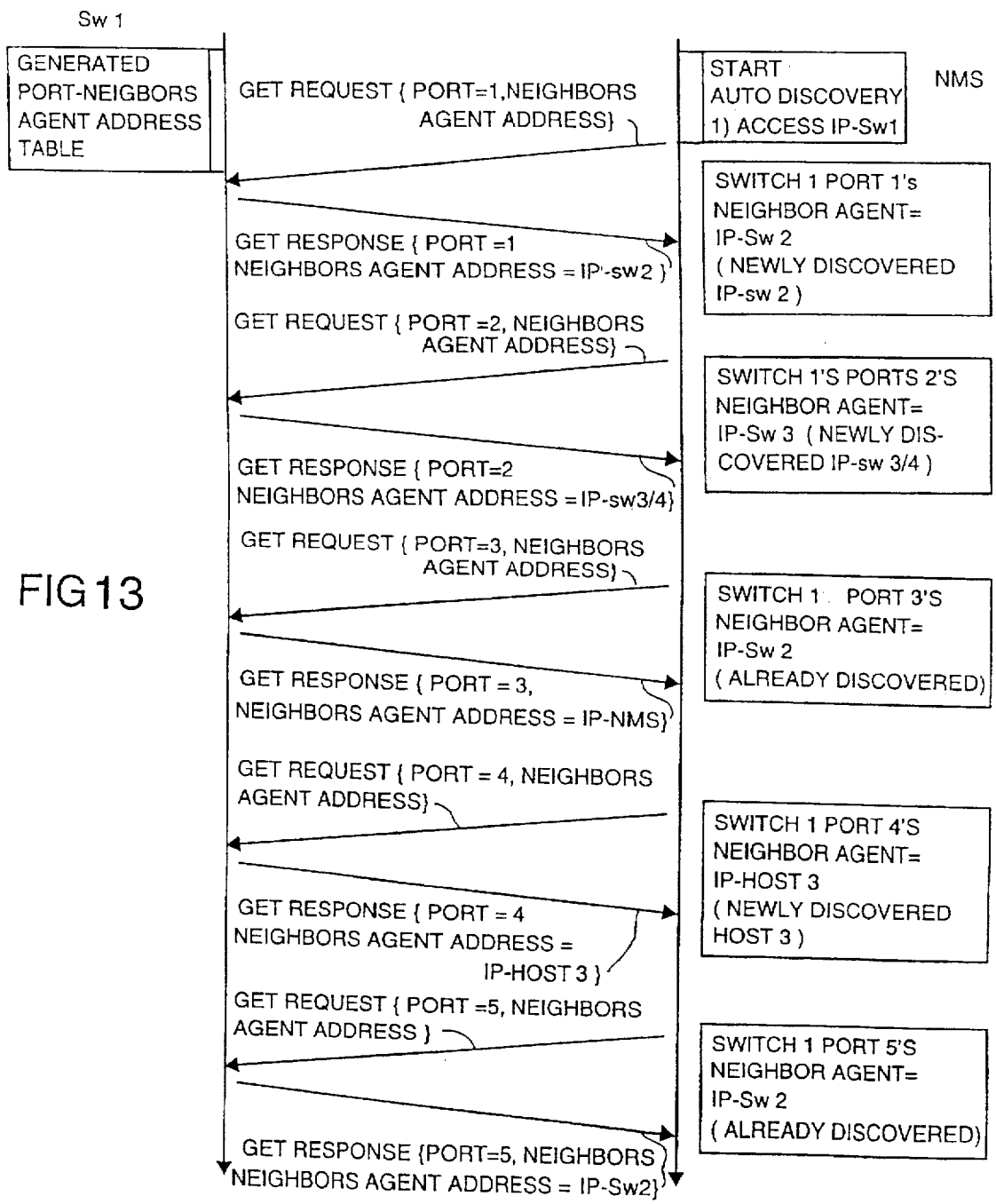
FIG. 13 shows the sequential flow of communication by a GET command between the NMS and Sw1, wherein the NMS reads out the neighbor table of IP-Sw1 and discovers IP-Sw2 and IP-Sw3/4, and host 1.

NMS-A first gets the SNMP agent network address IP-Sw1 of Sw1 connected to its own ATM port 1 through ILMI protocol, whereby NMS-A accesses agent IP-Sw1 to read out the table of FIG. 11(a) of Sw1, which is managed by agent IP-Sw1. For example, NMS-A reads out the information for Sw1 from port 1 to port 5, as shown in FIG. 13. FIG. 13 shows the sequence by which NMS-A reads out neighbor agent IP addresses of each port of Sw1 by means of SNMP "Get Request" commands. In this way, NMS-A obtains information relating to port 1 through port 5 of Sw1. For example, NMS-A detects whether each port of this Sw1 is NNI or UNI, and furthermore, searches for neighbor ATM switches connected to the NNI ports or neighbor terminals connected to UNI ports. For example, NMS-A can discover that IP-host 3 is connected to a UNI port, or conversely, confirm that NMS-A is connected at port 3 of Sw1.

As for the NNI ports of Sw1, NMS-A can find on one hand that an ATM switch managed by IP-Sw2 is connected at port 1 and port 5, and on the other hand that an ATM switch managed by IP-Sw3/4 is connected at port 2. Similarly, NMS-A accesses the agent of IP-Sw2 and recognizes the existence of Sw2. In the same way, NMS-A recognizes the existence of Sw3 and Sw4 by accessing IP-Sw3/4. NMS-A then confirms that Sw2 is indeed connected at ports 3 and 2 to Sw1, and that Sw3 is connected at port 3-1 to Sw1. If this confirmation cannot be achieved, NMS-A determines that the information of the above-described table is in error, ignores the information, and reinitiates ILMI of that link to obtain correct information.

Figure 14:
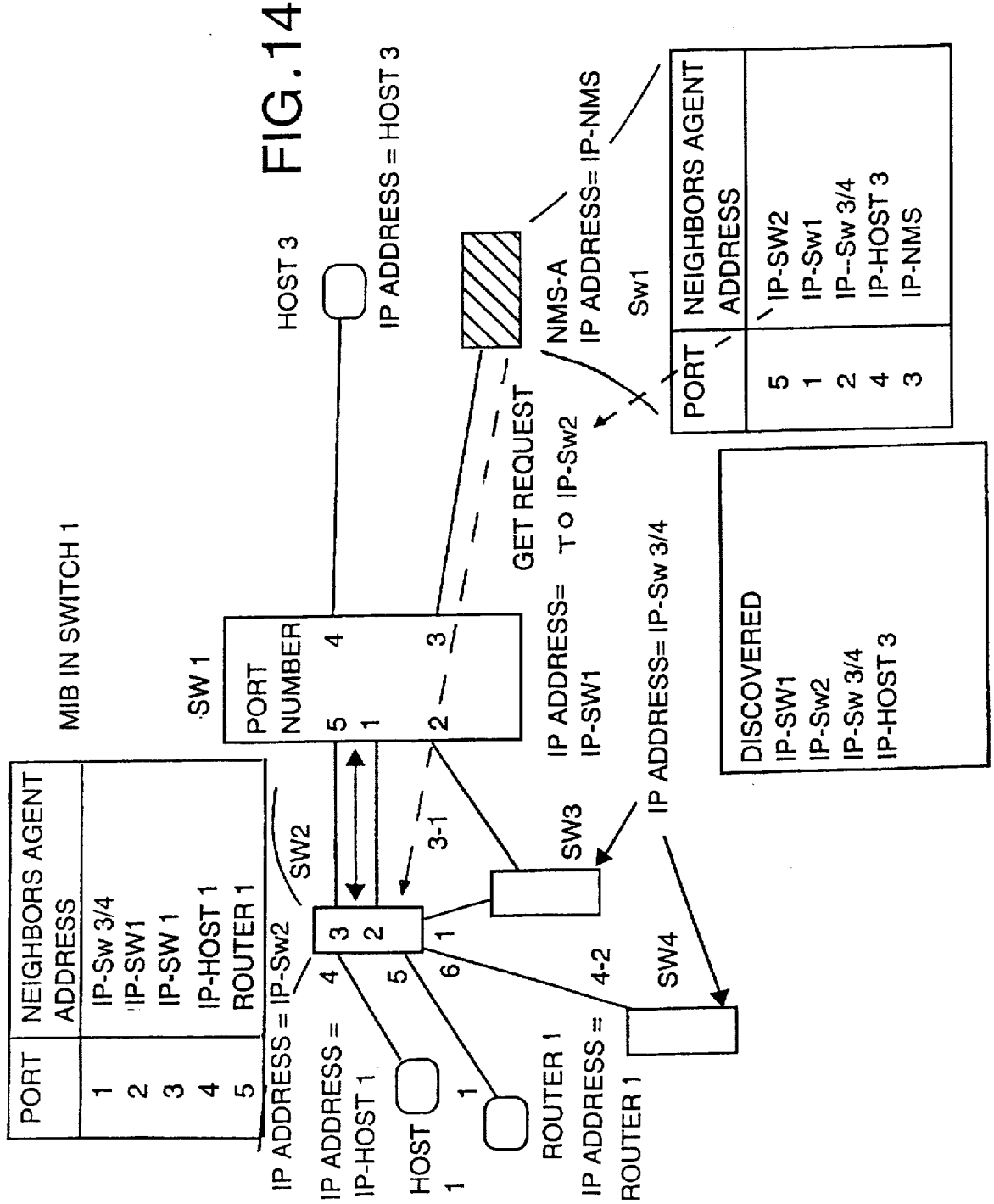
FIG. 14 shows access of IP-Sw2 by NMS-A using the discovered neighbor address list of Sw1 and the generation by Sw2 of neighbor MIB tables in Sw2.
Figure 15:
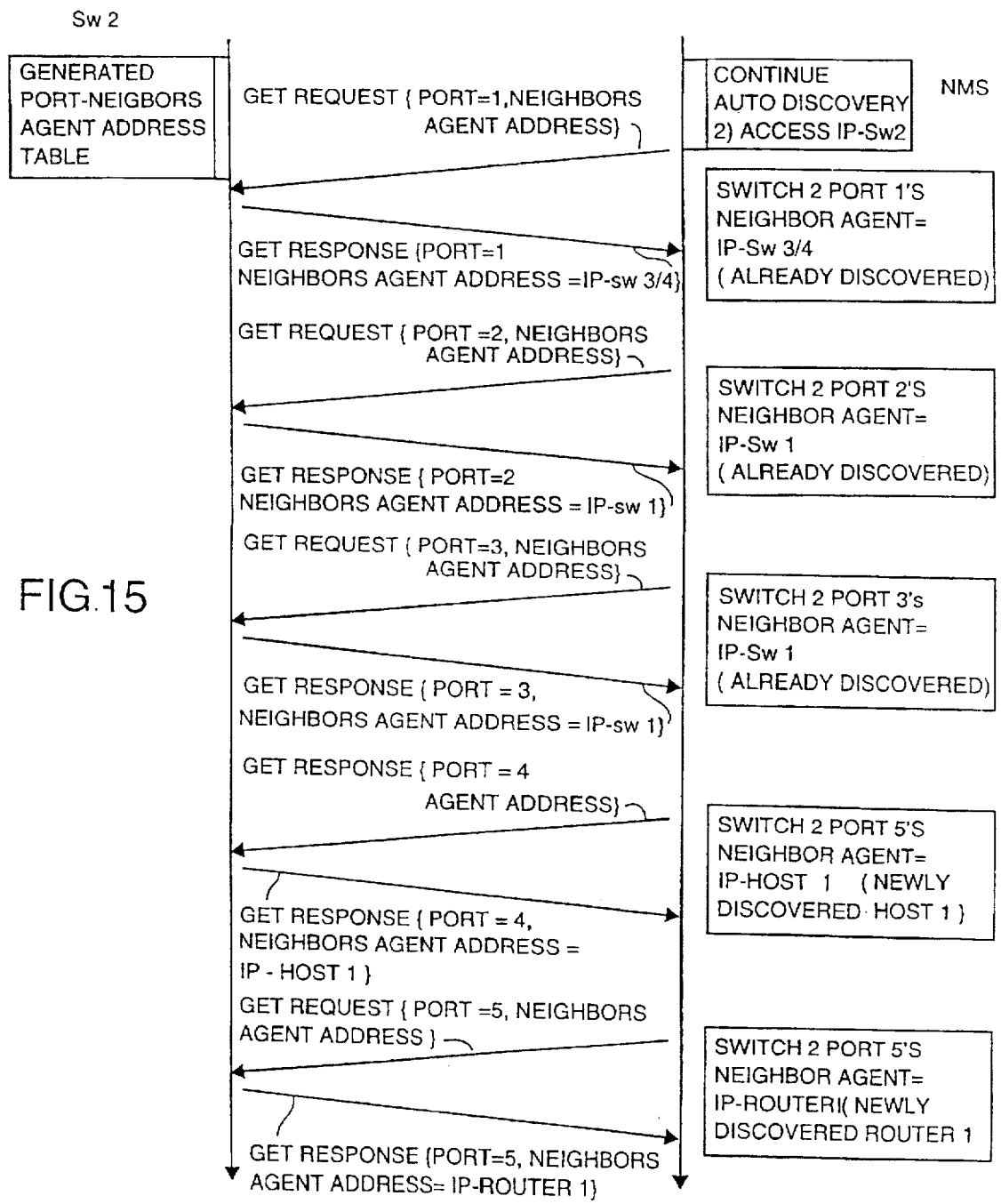
FIG. 15 shows the sequential flow of communication by a GET command between the NMS and Sw2, and the accessing of IP-Sw2 by NMS-A using the discovered neighbor address list of Sw1.
Figure 16:
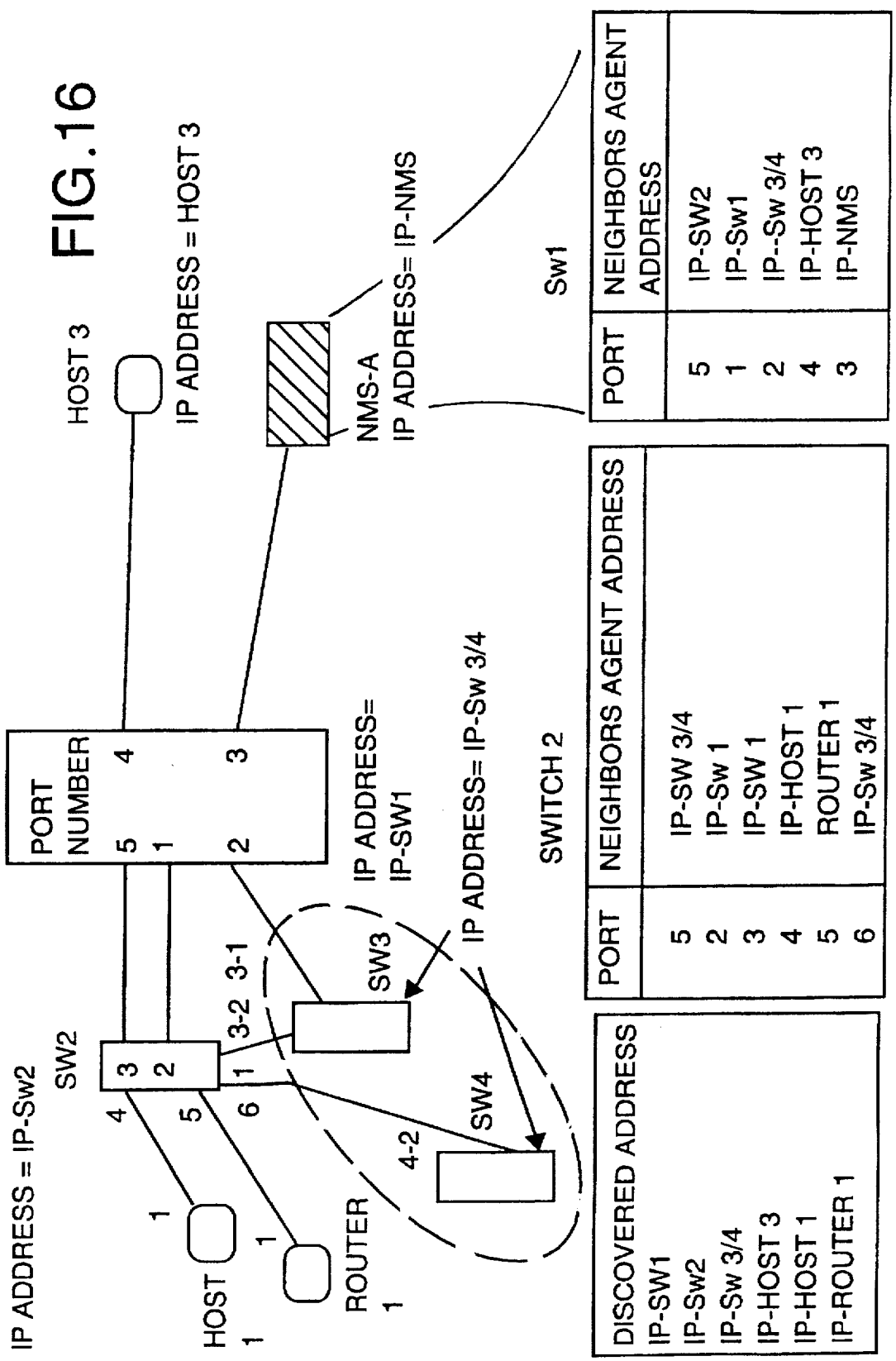
FIG. 16 shows the access of IP-Sw2 by NMS-A using he discovered neighbor address list of Sw1, the subsequent discovery of host 1 and router 1, the discovery of Sw1, and the discovery of Sw3 and Sw4, whereupon these switches are treated as the same switch since all have the same IP address (IP-Sw3/4), which is the proxy agent for Sw4.

By repeating the above-described operations, NMS-A can recognize and confirm the physical connection relationships of the ATM switches and ATM terminals within the ATM network. For example, as shown in FIG. 14, NMS-A accesses Sw2 and discovers an ATM terminal connected to Sw2. The sequence of this information exchange is shown in FIG. 15. As shown by the results of this exchange shown in FIG. 16, host 1 and router 1 are discovered from Sw2. In this way, NMS-A discovers router 1 connected to Sw2, whereupon it can read the address conversion cache table within router 1 shown in FIG. 2, which allows NMS-A to further discover host 2 connected on the Ethernet. NMS-A thus automatically recognizes the configuration of IP nodes of an existing network in addition to ATM switches and ATM terminals within the ATM network.

Next will be described the manner in which NMS-B recognizes and confirms, from outside the ATM network, the physical connection relationships of ATM switches and other elements inside the ATM network. NMS-B first recognizes the existence of router 1 by reading out its own address conversion cache table by the auto IP node discovery system of the prior art. NMS-B then recognizes that router 1 has an ATM interface by accessing the agent of router 1 and reading out the address conversion cache table of FIG. 2. NMS-B then reads out the port connection table of FIG. 12, gets network address IP-Sw2 of the agent of neighbor Sw2, and accesses SNMP agent IP-Sw2 at this address. This access request is normally executed by SNMP/UDP/IP packets, and according to this request router 1 accesses the ATM switches and ATM terminals within the ATM network at only network address IP-Sw2.

In this way, NMS-B reads out the port connection relationship table of Sw2 of FIG. 4(b), and thus confirms that Sw2 is indeed connected to router 1 at port 5. NMS-B further finds that each of ATM terminal host 1, Sw1 managed by agent IP-Sw1, and ATM switches managed by agent IP-Sw3/4 are connected to Sw2. NMS-B then accesses each Sw1 agent IP-Sw1 and recognizes the existence of Sw1. NMS-B similarly confirms that each port of Sw1 is indeed connected to Sw2.

As described herein, using tables holding network addresses (in this case, IP addresses) of agents that manage ATM switches and ATM terminals, NMS-B can successively access each agent by way of the router and discover neighbor nodes, granted that router 1 has a protocol capable of communicating with each ATM agent from IP addresses. Such a protocol may be for example, IP over ATM protocol as specified by IETF RFC1577.

As is also described herein, either an NMS directly connected to an ATM network such as NMS-A or an NMS outside the ATM network such as NMS-B can automatically recognize and manage the physical connection relationships of ATM switches and ATM terminals within the ATM network. The configuration of each ATM network within a plurality of ATM networks divided by a plurality of routers can also be managed by a single NMS. Furthermore, the NMS can detect changes in topology by periodically executing the above-described operations.

A third embodiment of the present invention will next be described.

In the second embodiment of the present invention, Sw1 and Sw2 are connected by two links, and if only the address of a network management agent of a neighbor ATM switch or ATM terminal is exchanged by ILMI protocol, the NMS cannot distinguish that port 3 of Sw2 is connected to port 5 of Sw1, or that port 2 of Sw2 is connected to port 1 of Sw1.

As shown in FIG. 4, a "My Port ID" port identifier is added, and by exchanging this identifier between neighbor ATM switches or between an ATM switch and an ATM terminal, the ATM switch can recognize which of its ports is connected to which ports of another ATM switch.

This point will be explained in further detail with reference to FIG. 4. In an example of information mutually exchanged between each ATM switch or ATM terminal and neighbor ATM switches or ATM terminals by ILMI protocol, a port identifier "My Port ID" is assigned to each port when the system rises. FIG. 4 presents the following information:

(a-1) is the ILMI MIB content of port 5 of Sw2, (a-2) is the ILMI MIB content of port 1 of router 1, (b-1) is the ILMI MIB content of port 3 of Sw2, (b-2) is the ILMI MIB content of port 5 of Sw1, (c-1) is the ILMI MIB content of port 6 of Sw2, (c-2) is the ILMI MIB content of port 4-2 of Sw4, (d-1) is the ILMI MIB content of port 3-3 of Sw3, and (d-2) is the ILMI MIB content of port 4-3 of Sw4.

The above information is exchanged by ILMI protocol with neighbor switches or neighbor terminals for every ATM link. For example, (a-1) and (a-2) are mutually communicated on the ATM link between Sw2 and neighbor router 1, (b-1) and (b-2) are mutually communicated on the ATM link between Sw2 and neighbor Sw1, (c-1) and (c-2) are mutually communicated on the ATM link between Sw2 and neighbor Sw4, and (d-1) and (d-2) are mutually communicated on the ATM link between Sw3 and neighbor Sw4.

Figure 17:
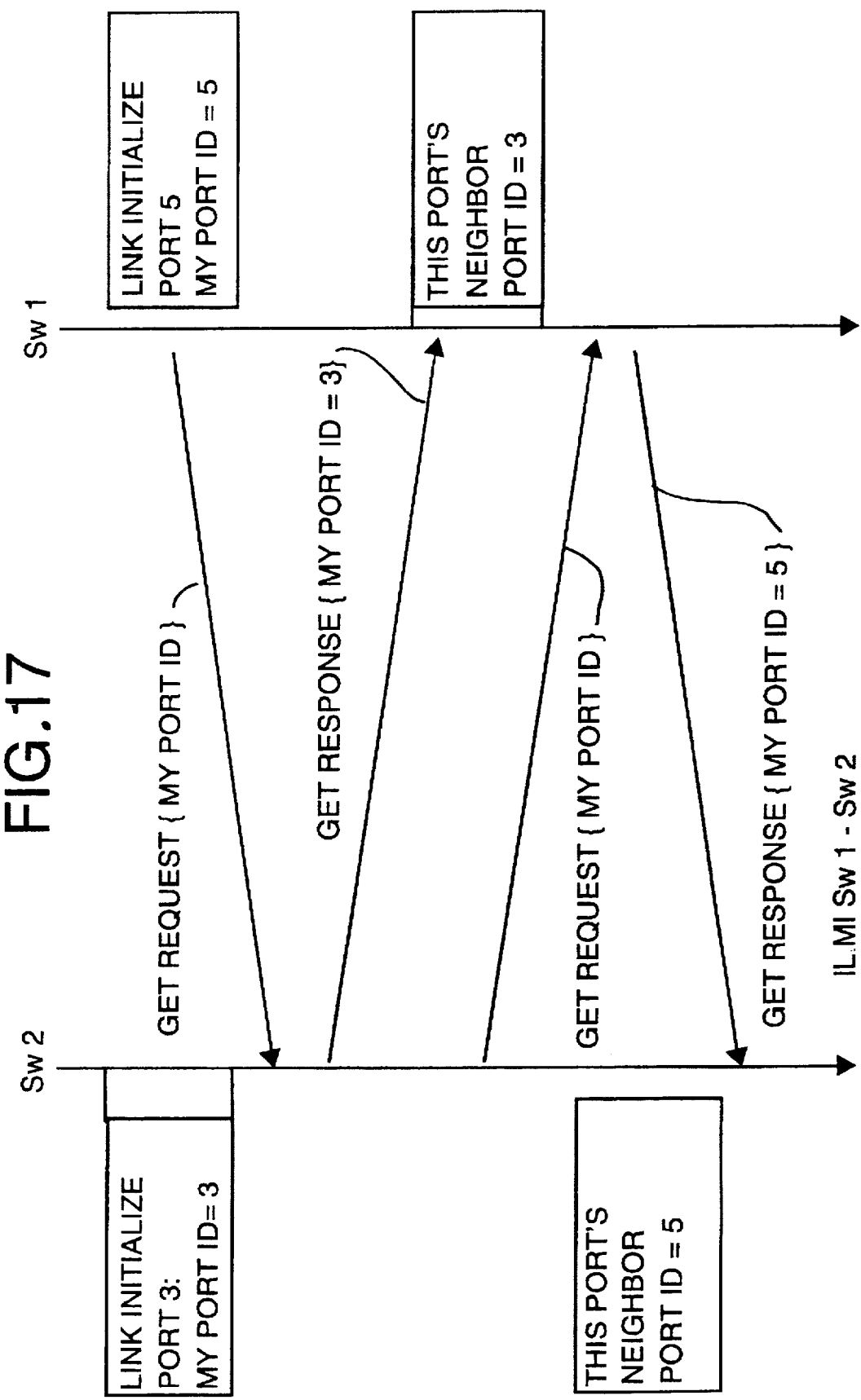
FIG. 17 shows the sequential flow of communication by a GET command between Sw1 and Sw2, and the neighbor port ID discovery for Sw1 and Sw2.

For example, FIG. 17 shows the sequence of communication exchange between Sw2 and Sw1.

By exchanging ILMI MIB according to the third embodiment of the present invention, each switch SNMP agent of each ATM switch can hold a port connection relationship table such as shown in FIG. 11.

(a) is the port table of agent IP-Sw1, (b) is the port table of agent IP-Sw2, and (c) is the port table of agent IP-Sw3/4.

The port connection relationship table of FIG. 11 has the following entries: "My port" is the port ID of its own port. "Neighbor port" identifies which port of the neighbor ATM switch or ATM terminal that port is connected to and is copied from the value acquired by ILMI of "My Port ID MIB" of the neighbor ATM switch or ATM terminal. For example, from table (a) of FIG. 11, Sw1:

is connected at port 1 to "port 2" of the ATM switch managed by agent IP-Sw2;

is connected at port 2 to "port 3-1" of the ATM switch managed by agent IP-Sw3/4;

is connected at port 3 to "port 1" of NMS-A;

is connected at port 4 to "port 1" of the ATM terminal managed by agent IP-host 3; and is connected at port 5 to "port 3" of the ATM switch managed by agent IP-Sw2.

In addition, Sw1 and Sw2 are connected by two ATM links, and from tables (a) and (b), it can be seen that port 3 of Sw2 is connected to port 5 of Sw1, and port 2 of Sw2 is connected to port 1 of Sw1.

Configuration management is thus enabled even if a plurality of links are established between ATM switches.

FIG. 12 shows an ATM port connection relationship table held by router 1, which is the single ATM terminal, and FIG. 2 shows the address conversion cache tables of standard data link addresses and network addresses.

Based on the above-described tables of FIGS. 2, 11, and 12, an explanation will next be given regarding the manner in which network management system NMS-A or NMS-B performs configuration management of an entire network that includes an ATM network configuration and an existing LAN. Explanation will first be given regarding NMS-A.

Figure 18:
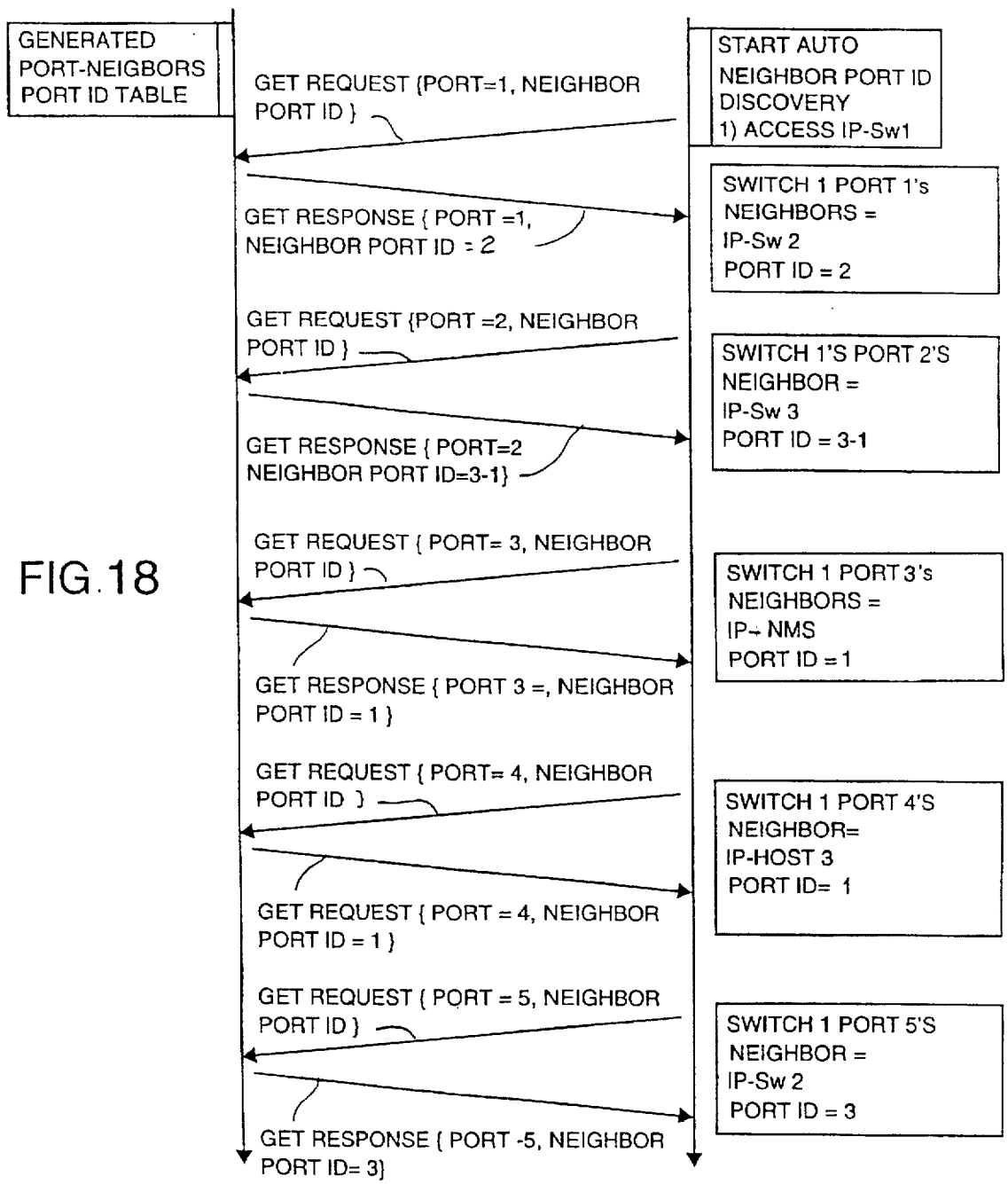
FIG. 18 shows the sequential flow of communication by a GET command between NMS and Sw1, the NMS reading out the neighbor port table of IP-Sw1 and discovering the individual port IDs of neighbor nodes of Sw1.

NMS-A first gets the SNMP agent network address IP-Sw1 of Sw1 connected to its own ATM port 1 by means of ILMI protocol, whereby NMS-A accesses agent IP-Sw1 and reads out table (a) of FIG. 11 for Sw1 that is managed by agent IP-Sw1. For example, as shown in FIG. 18, NMS-A gets the Neighbor Port ID of port 5 from port 1 of Sw1, whereby NMS-A can get the information relating to port 5 from port 1 of Sw1. For example, NMS-A finds that of the NNI ports of Sw1, port 1 and port 5 are connected to port 2 and port 3, respectively, of the ATM switch managed by IP-Sw2, and port 2 is connected to port 3-1 of the ATM switch managed by IP-Sw3/4, and NMS-A similarly accesses the agent of IP-Sw2 and recognizes the existence of Sw2. On the other hand, by accessing IP-Sw3/4, NMS-A recognizes the existence of Sw3 and Sw4. NMS-A then confirms that port 3 and port 2 of Sw2 are indeed connected to port 5 and port 1 of Sw1, and that port 3-1 of Sw3 is connected to port 2 of Sw1. If this confirmation cannot be achieved, NMS-A determines that the information of the above-described table is in error, ignores the information, and reinitiates ILMI of these links to obtain correct information.

By repeating the above-described operations, NMS-A is able to recognize and confirm the physical connection relationships of the ATM switches and ATM terminals within the ATM network.

Next will be described the manner in which NMS-B recognizes and confirms from outside the ATM network the physical connection relationships of switches and other elements inside the ATM network. NMS-B first recognizes the existence of router 1 by reading out its own address conversion cache table by the prior art auto IP node discovery system. NMS-B then accesses the agent of router 1 and recognizes that router 1 has an ATM interface by reading out the address conversion cache table of FIG. 2. NMS-B thereupon reads out the port connection table of FIG. 12 and gets network address IP-Sw2 of the agent of neighbor Sw2. NMS-B then accesses SNMP agent IP-Sw2 at this address. This access request is normally executed by SNMP/UDP/IP packets, and according to this request router 1 accesses ATM switches and ATM terminals within the ATM network at only network address IP-Sw2. If necessary, NMS-B sets SVC.

In this way, NMS-B reads out the port connection relationship table of Sw2 of FIG. 11(b), and thus confirms that Sw2 is indeed connected at port 5 to port 1 of router 1. NMS-B further finds that Sw2 is also connected to each of ATM terminal host 1, Sw1 managed by agent IP-Sw1, and ATM switches managed by agent IP-Sw3/4. NMS-B then accesses agent IP-Sw1 and agent IP-Sw3/4 which manage each of Sw1, Sw3, and Sw4 and recognizes the existence of Sw1, Sw3, and Sw4. NMS-B similarly confirms that each port of these ATM switches is indeed connected to Sw2.

The fourth embodiment of the present invention will next be explained.

The fourth embodiment provides an auto ATM network configuration recognition method for cases in which one SNMP agent simultaneously manages a plurality of ATM switches. For example, as shown in FIG. 3, Sw3 and Sw4 are together managed by a single SNMP agent, the IP address of which is IP-Sw3/4.

Each SNMP agent assigns a port identifier "Port ID" to each port at the time the system rises. To individually manage each port of Sw3 and Sw4, SNMP agent IP-Sw3/4 assigns port identifiers "Port ID=3-1, 3-2, and 3-3" to the ports of Sw3 and "Port ID=4-1, 4-2, and 4-3" to the ports of Sw4. The port identifiers may actually also be numbered continuously from 1 to 6 or be given names, the condition being that IP-Sw3/4 must be able to distinguish which port identifier corresponds to each port of Sw3 or Sw4. The SNMP agent that has IP address IP-Sw3/4 is actually installed at Sw3, and a controller labeled "Proxy agent-Sw4" is installed at Sw4. Proxy agent-Sw4 manages the state of Sw4, but SNMP protocol or an SNMP NMS agent is not installed. The state of Sw4 is managed on the SNMP agent IP-Sw3/4 side through information exchange by means of this Proxy agent-Sw4 with SNMP agent IP-Sw3/4 on an independent interface. Essentially, the MIB that is accessible by the NMS exists in agent IP-Sw3/4. Regarding ILMI, a case is conceivable in which Proxy agent-Sw4 carries out ILMI with a neighbor switch. However, even in such a case, it is also conceivable that ILMI does not terminate at the proxy agent but is forwarded to agent IP-Sw3/4, and the principles of the present invention can in such a case be applied without change.

Figure 19:
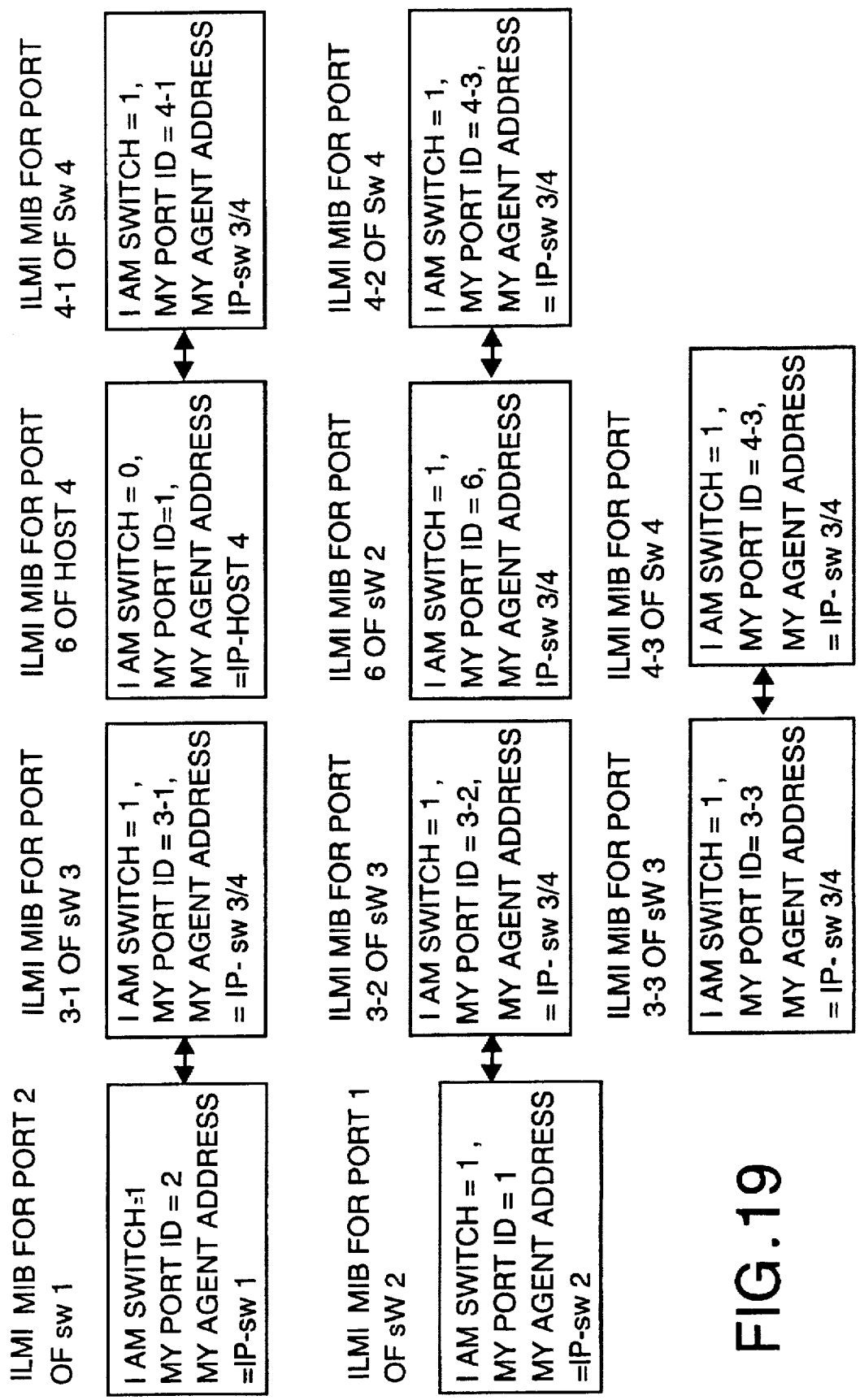
FIG. 19 shows ILMI MIB operations for Sw3/4.
Figure 20:
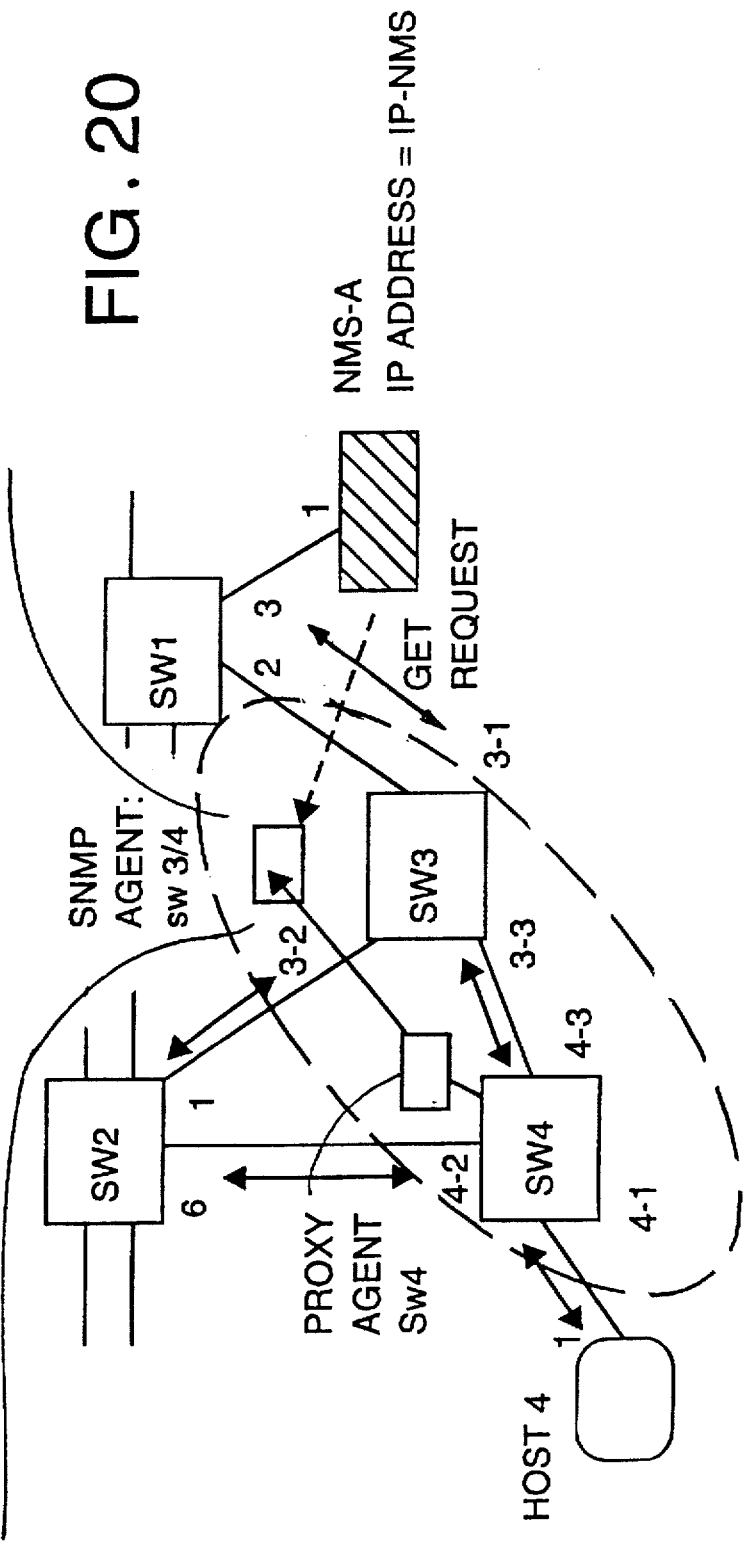
FIG. 20 shows access of the Sw3/4 agent by the NMS to discover neighbor nodes and port IDs for Sw3 and Sw4.

FIG. 4 shows an example of ILMI MIB information exchanged by ATM switches 3 and 4 with ATM switches as well as ATM terminals connected to ATM switches 3 and 4. FIG. 19 shows ILMI MIB information exchanged between Sw3 and Sw1, Sw3 and Sw2, Sw3 and Sw4, Sw4 and host 4, and Sw4 and Sw2.

Here, it should be noted that the port identifiers of Sw4 are "My port ID=4-2, 4-3," the port identifiers of Sw3 are "My port ID=3-3," and that "My Agent Address" are both IP-Sw3/4. Essentially, although Sw4 lacks an SNMP agent such as IP-Sw3/4 at its own ATM switch, neighbor switches and/or neighbor terminals are notified that its state management is carried out by an SNMP agent IP-Sw3/4 by way of the Proxy agent.

Through the above-described exchange of ILMI MIB, the SNMP agent of each of ATM switches Sw3 and Sw4 can hold a port connection relationship table as shown in FIG. 11.

(a) is the port table of agent IP-Sw1, (b) is the port table of agent IP-Sw2, and (c) is the port table of agent IP-Sw3/4.

Here it should be noted that the states of the ports of Sw4 are actually managed by SNMP agent IP-Sw3/4 at Sw3. The states of the ports of Sw4 are communicated through communication, by proxy agent Sw4 to SNMP agent IP-Sw3/4, of ILMI MIB for companion ports of neighbor switches or neighbor terminals that are received from each port.

For example, according to table (a) of FIG. 11, Sw1 is:

connected at port 1 to port 2 of the ATM switch managed by agent IP-Sw2;

connected at port 2 to port 3-1 of the ATM switch managed by agent IP-Sw3/4;

connected at port 3 to port 1 of NMS-A;

connected at port 4 to port 1 of the ATM terminal managed by agent IP-host 3; and connected at port 5 to port 3 of the ATM switch managed by agent IP-Sw2. In this case, each port is a bidirectional port.

Here, it should be noted that even though there is no agent having an IP address at Sw4, Sw4 may be managed by an SNMP agent installed with IP protocol and existing at a remote location. In this example, Sw3/4, the agent of Sw3, manages both Sw3 and Sw4. In this way, merely installing a simple proxy agent provides an economical alternative to installing SNMP/UDP/IP at all ATM switches.

In this case, to distinguish each port of Sw3 and Sw4, agent IP-Sw3/4 of Sw3 divides and discriminates port identifiers as 3-1, 3-2, 4-2, and 4-3.

For example, according to table (b) of FIG. 11, Sw2 is actually connected at port 1 to port 2 of Sw3, and Sw2 is connected at port 6 to port 2 of Sw4, but in this table, it is shown that Sw2 is connected at port 1 to port 3-2 of the ATM switch managed by agent IP-Sw3/4, and Sw2 is connected at port 6 to port 4-2 of the ATM switch managed by agent IP-Sw3/4.

As for Sw3 and Sw4, agent IP-Sw3/4 manages port connection table (c) of FIG. 11 as a block. It is sufficient that agent IP-Sw3/4, which manages both ATM switches Sw3 and Sw4, be able to distinguish that "My Port=3-1, 3-2, 3-3" are the ports of Sw3 and "My Port=4-1, 4-2, 4-3" are the ports of Sw4. For these two ATM switches, it can be found from table (c) of FIG. 11 that "My port=3-3" of Sw3 is connected to "Neighbor-port=4-3" of Sw4, and that "My port=4-3" of Sw4 is connected to "Neighbor-port=3-3" of Sw3, but because these ports are bidirectional, information for one side is redundant.

Based on the above-described FIGS. 2, 11, and 12, explanation will next be given of the manner in which network management system NMS-A or NMS-B manages an entire configuration including an ATM network configuration and an existing LAN. NMS-A will first be explained.

NMS-A first gets the SNMP agent network address IP-Sw1 of Sw1 connected to its own ATM port 1 through ILMI protocol, whereby NMS-A accesses agent IP-Sw1 to read out table (a) for Sw1 of FIG. 11, which is managed by agent IP-Sw1, thus recognizing the existence of Sw1 having port 1 to port 6. NMS-A next detects whether each port of Sw1 is NNI or UNI and searches neighbor switches connected to NNI ports or neighbor terminals connected to UNI ports. Here, NMS-A is able to detect that each IP host 3 is connected to UNI ports, and conversely, confirms that NMS-A is connected at port 3 of Sw1.

As for the NNI ports of Sw1, NMS-A can find on one hand that ports 1 and 5 are connected to ports 2 and 3, respectively, of an ATM switch managed by IP-Sw2, and on the other hand that port 2 is connected to port 3-1 of an ATM switch managed by IP-Sw3/4. Similarly, NMS-A accesses the agent of IP-Sw2 and recognizes the existence of Sw2. In the same way, NMS-A recognizes the existence of Sw3 and Sw4 by accessing IP-Sw3/4. NMS-A then confirms that Sw2 is indeed connected at ports 3 and 2 to ports 5 and 1, respectively, of Sw1, and that Sw3 is connected at port 3-1 to Sw1. If this confirmation cannot be achieved, NMS-A determines that the information of the above-described table is in error, ignores the information, and reinitiates ILMI of that link to obtain correct information.

By repeating the above-described operations, NMS-A can recognize and confirm the physical connection relationships of the ATM switches and ATM terminals within the ATM network.

NMS-A then discovers router 1, which is connected to Sw2, whereupon by reading the address conversion cache table of FIG. 2, NMS-A is further able to discover host 2 connected to the Ethernet. NMS-A thus automatically recognizes the configuration of IP nodes of an existing network in addition to ATM switches and ATM terminals within an ATM network.

Next will be described the manner in which NMS-B recognizes and confirms from outside the ATM network the physical connection relationships of ATM switches and other elements inside the ATM network. NMS-B first recognizes the existence of router 1 by reading out its own address conversion cache table through IP node discovery of the prior art. NMS-B then recognizes that router 1 has an ATM interface by accessing the agent of router 1 and reading out the address conversion cache table of FIG. 2. NMS-B hereupon reads out the port connection table of FIG. 12, gets network address IP-Sw2 of the agent of neighbor Sw2, and accesses SNMP agent IP-Sw2 at this address. This access request is normally executed by SNMP/UDP/IP packets, and according to this request, router 1 accesses the ATM switches and ATM terminals within the ATM network at only network address IP-Sw2. If necessary, NMS-B sets SVC.

In this way, NMS-B reads out port connection relationship table (c) of Sw2 in FIG. 11 and thus confirms that Sw2 is indeed connected at port 5 to port 1 of router 1. NMS-B further finds that each of ATM terminal host 1, Sw1 managed by agent IP-Sw1, and ATM switches managed by agent IP-Sw3/4 are connected to Sw2. NMS-B then accesses agent IP-Sw1 and agent IP-Sw3/4 which manage each of Sw1, Sw3 and Sw4 and recognizes the existence of Sw1, Sw3 and Sw4. NMS-B similarly confirms that each port of these ATM switches is indeed connected to Sw2.

As described hereinabove, by having tables hold network addresses (in this case, IP addresses) of agents that manage ATM switches and ATM terminals, NMS-B can successively access each agent by way of a router and discover neighbor nodes, granted, however, that router 1 has a protocol capable of communicating with each ATM agent from IP addresses. Such a protocol may be for example, IP over ATM protocol as specified by IETF RFC1577.

As described hereinabove, an NMS directly connected to an ATM network and an NMS outside the ATM network are equally capable of automatically recognizing and managing physical connection relationships of ATM switches and ATM terminals within the ATM network. Furthermore, a single NMS can perform configuration management of each ATM network in cases where a plurality of ATM networks are divided by a plurality of routers. In addition, changes in topology can be detected by periodically executing the above-described operations.

A fifth embodiment of the present invention will next be explained.

The fifth embodiment of the present invention adopts a method by which the state of each port in the first to fourth embodiments is held as ILMI MIB shown in FIG. 4, this information is held as a differing MIB accessible by an NMS and accordingly read out by an NMS. However, even if the state of each port is managed using another similar data structure, this embodiment is generally applicable in exactly the same manner as the first to fourth embodiments configured such that an NMS reads out this data.

The present invention provides a network topology discovery method by which an ATM switch or ATM terminal automatically recognizes local connection relationships with neighbor ATM switches or ATM terminals, and through access of connection information by a network management system, automatically recognizes the physical connection relationships of each ATM switch and each ATM terminal within an ATM network.

In particular, the present invention provides a network topology auto discovery method by which a network management system is equally capable of recognizing the configuration of an ATM network whether the network management system exists inside or outside the ATM network, and furthermore provides a network topology auto discovery method that is easily integrable with a method that automatically recognizes devices lacking ATM interfaces such as routers or hosts other than the ATM network. Essentially, the present invention provides a network topology discovery method capable of recognizing by the same method the configuration of both an ATM network and coexisting routers and existing LANs.

In addition, the present invention provides a network topology discovery method capable of recognizing the individual identities of ports that are connected between ATM switches having a plurality of links.

Finally, the present invention provides the same functions without assigning one ATM network management agent to each ATM switch. Through automatic identification of interfaces between ATM switches and between an ATM switch and ATM terminal, the present invention enables operation of an ATM network wherein the network manager need not set ATM switches. It is to be understood, however, that although the characteristics and advantages of the present invention have been set forth in the foregoing description, the disclosure is illustrative only, and changes may be made in the arrangement of the parts within the scope of the appended claims.

What is claimed is:

1. A method of determining an ATM network topology in an ATM network by which a plurality of ATM switches and a plurality of ATM terminals are interconnected, each of said ATM terminals having at least one respective port and each of said ATM switches having a respective plurality of ports through which each of said ATM switches and ATM terminals is directly connected to its neighboring ATM switches and ATM terminals; said method comprising the steps of:

storing, in each respective one of said ATM switches and ATM terminals, a respective switch identifier that indicates whether said respective ATM switch or ATM terminal is an ATM switch;

exchanging said respective switch identifier between said respective ATM switch or ATM terminal with those of its neighboring ATM switches and ATM terminals;

determining, for each respective port of said respective ATM switch or ATM terminal, whether a network node interface for connecting two neighboring ATM switches is present or whether a user-network interface for connecting an ATM switch and an ATM terminal is present using said exchanged switch identifiers; and automatically setting a data communications protocol format that corresponds to said determined interface and which identifies said respective ATM switch or ATM terminal.

2. The method of claim 1, further comprising the step of storing a network address, a port identifier and said respective switch identifier as a respective management information base for each said respective port of said each ATM switch or ATM terminal, and exchanging said respective management information base with those of said neighboring ATM switches or ATM terminals concurrent with said step of exchanging said respective switch identifier.

3. A method of determining an ATM network topology in an ATM network by which a plurality of ATM switches and a plurality of ATM terminals are interconnected, each of said ATM terminals having at least one respective port and each of said ATM switches having a respective plurality of ports through which each of said ATM switches and ATM terminals is directly connected to its neighboring ATM switches and ATM terminals; said method comprising the steps of:

storing, in each respective one of said ATM switches and ATM terminals, a respective network address of a network management agent that manages said respective ATM switch or ATM terminal;

exchanging said respective network address between said respective ATM switch or ATM terminal with those of its neighboring ATM switches and ATM terminals;

storing, in said each respective ATM switch or ATM terminal, a table that includes, for each said respective port of said respective ATM switch or ATM terminal, the network addresses of the network agents that manage said neighboring ATM switches and ATM terminals that is connected to said each port;

determining, using a network management system, the connection relationships been each of said ATM switches and ATM terminals by determining the network address of the network management agent that manages a selected one of said ATM switches and ATM terminals, reading out said table stored in said selected ATM switch or ATM terminal to determine the network addresses of the network management agents that manage its corresponding neighboring ATM switches and ATM terminals, accessing each of said network management agents of said corresponding neighboring ATM switches and ATM terminals to determine further ATM switches and ATM terminals managed by said each network management agent, and repeatedly reading out the respective tables stored in said further ATM switches and ATM terminals, determining the network addresses stored therein and determining still further ATM switches and ATM terminals until all said connection relationships of each of said plurality of said ATM switches and ATM terminals are determined.

4. The method of claim 3, wherein, when at least one of said network management agents manages at least two of said plurality of ATM switches and ATM terminals, said table includes said network addresses of said network management agents that manage each of said neighboring ATM terminals and ATM switches of each of said at least two ATM terminals and ATM switches.

5. The method of claim 4 further comprising the step of storing said network addresses, a port identifier and a plurality of switch identifiers as a respective management information base for each said respective port of said each ATM switch or ATM terminal, and exchanging said respective management information bases with those of said neighboring ATM switches and ATM terminals concurrent with said step of exchanging said respective network address between said respective ATM switch or ATM terminal with those of its neighboring ATM switches and said ATM terminals.

6. The method of claim 3 further comprising the step of storing said network addresses, a port identifier and a plurality of switch identifiers as a respective management information base for each said respective port of said each ATM switch or ATM terminal, and exchanging said respective management information bases with those of said neighboring ATM switches and ATM terminals concurrent with said step of exchanging said respective network address between said respective ATM switch or ATM terminal with those of its neighboring ATM switches and ATM terminals.

7. A method of determining an ATM network topology in an ATM network by which a plurality of ATM switches and a plurality of ATM terminals are interconnected, each of said ATM terminals having at least one respective port and each of said ATM switches having a respective plurality of ports through which each of said ATM switches and ATM terminals is directly connected to its neighboring ATM switches and ATM terminals; said method comprising the steps of:

storing, in each respective one of said ATM switches and ATM terminals, at least one respective port identifier that identifies each of said respective ports of said ATM switch or ATM terminal;

exchanging said respective port identifier between said respective ATM switch or ATM terminal with those of its neighboring ATM switches and ATM terminals;

storing, in said each respective ATM switch or ATM terminal, a table that includes, for each respective port of said respective ATM switch or ATM terminal, said port identifier of said neighboring ATM switch and ATM terminal that is connected to said each respective port; and automatically recognizing, using a network management system, the respective ports of said neighboring ATM switches and ATM terminals by accessing said table, thereby determining the physical connection relationships of said ATM network.

8. The method of claim 7 further comprising the steps of storing, in said each respective ATM switch or ATM terminal, a respective network address of a network management agent that manages said respective ATM switch or ATM terminal; exchanging said respective network address between said respective ATM switch or ATM terminal with those of said neighboring ATM switches and ATM terminals; and storing, in said each respective ATM switch or ATM terminal, a further table that includes, for each said respective port of said respective ATM switch or ATM terminal, the network addresses of the network agents that manage said neighboring ATM switches and ATM terminals wherein, when at least one of said network management agents manages at least two of said plurality of ATM switches and ATM terminals, said further table includes said network addresses of said network management agents that manage each of said neighboring ATM terminals and ATM switches of each of said at least two ATM terminals and ATM switches.

9. The method of claim 8 further comprising the steps of storing a network address, said port identifiers and said switch identifiers as a respective management information base for said each respective port of each said respective ATM switch or ATM terminal, and exchanging said respective management information base with those of said neighboring ATM switches and ATM terminals concurrent with said step of exchanging said respective network address between said respective ATM switch or ATM terminal and its neighboring ATM switches with those of said ATM terminals.

10. The method of claim 7 further comprising the steps of storing a network address, said port identifiers and a plurality of switch identifiers as a respective management information base for said each respective port of each said respective ATM switch or ATM terminal, and exchanging said respective management information base with those of said neighboring ATM switches and ATM terminals concurrent with said step of exchanging said respective port identifier between said respective ATM switch or ATM terminal and its neighboring ATM switches and ATM terminals.

* * * * *